US008129471B2

(12) United States Patent
Chakravarti et al.

(10) Patent No.: US 8,129,471 B2
(45) Date of Patent: Mar. 6, 2012

(54) POLYCARBONATE-POLY(ETHER-ESTER) COPOLYMER COMPOSITION, METHOD OF MANUFACTURE, AND ARTICLES THEREFROM

(75) Inventors: Shreyas Chakravarti, Evansville, IN (US); Christopher Luke Hein, Evansville, IN (US); Peter Hendrikus Theodorus Vollenberg, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 57 days.

(21) Appl. No.: 12/649,396

(22) Filed: Dec. 30, 2009

(65) Prior Publication Data
US 2011/0155975 A1   Jun. 30, 2011

(51) Int. Cl.
*C08L 75/00* (2006.01)
*C08F 8/30* (2006.01)
*C08F 8/00* (2006.01)
(52) U.S. Cl. .................... 525/131; 525/182; 525/191
(58) Field of Classification Search .................. 525/182, 525/191, 131
See application file for complete search history.

(56) References Cited

U.S. PATENT DOCUMENTS

| | | | |
|---|---|---|---|
| 3,635,895 A | 1/1972 | Kramer | |
| 3,701,755 A | 10/1972 | Sumoto et al. | |
| 3,766,146 A | 10/1973 | Witsiepe | |
| 3,864,428 A | 2/1975 | Nakamura et al. | |
| 3,907,926 A | 9/1975 | Brown et al. | |
| 3,953,404 A | 4/1976 | Borman | |
| 4,001,184 A | 1/1977 | Scott | |
| 4,128,526 A | 12/1978 | Borman | |
| 4,140,670 A | 2/1979 | Charles et al. | |
| 4,157,325 A | 6/1979 | Charles et al. | |
| 4,200,567 A | 4/1980 | Goldman et al. | |
| 4,203,887 A | 5/1980 | Goedde et al. | |
| 4,264,487 A | 4/1981 | Fromuth et al. | |
| 4,337,192 A | 6/1982 | Campbell | |
| 4,349,469 A | 9/1982 | Davis et al. | |
| 4,355,155 A | 10/1982 | Nelsen | |
| 4,469,851 A | 9/1984 | Charles et al. | |
| 4,524,165 A | 6/1985 | Musser et al. | |
| 4,579,884 A | 4/1986 | Liu | |
| 4,598,117 A | 7/1986 | Liu et al. | |
| 4,657,973 A | 4/1987 | Endo et al. | |
| 4,742,109 A | 5/1988 | Takahashi et al. | |
| 4,778,855 A | 10/1988 | Boutni et al. | |
| 4,857,604 A | 8/1989 | Agarwal | |
| 4,877,831 A | 10/1989 | Hongo et al. | |
| 5,221,704 A | 6/1993 | Shimotsuma et al. | |
| 5,266,601 A | 11/1993 | Kyber et al. | |
| 5,981,661 A | 11/1999 | Liao et al. | |
| 6,476,158 B1 | 11/2002 | England et al. | |
| 6,518,322 B1 | 2/2003 | West | |
| 6,762,250 B2 | 7/2004 | Kanayama et al. | |
| 6,927,275 B2 | 8/2005 | Hirokane et al. | |
| 7,179,869 B2 | 2/2007 | Hirokane et al. | |
| 7,183,362 B2 | 2/2007 | Hirokane et al. | |
| 7,388,067 B2 | 6/2008 | Leemans et al. | |
| 7,829,632 B2 * | 11/2010 | Chakravarti et al. | 525/182 |
| 2005/0137359 A1 | 6/2005 | Agarwal et al. | |
| 2007/0275242 A1 | 11/2007 | Gopal et al. | |
| 2008/0023887 A1 | 1/2008 | Vollenberg et al. | |
| 2008/0027167 A1 * | 1/2008 | Vollenberg et al. | 524/505 |
| 2008/0125551 A1 | 5/2008 | Vollenberg | |
| 2009/0069489 A1 * | 3/2009 | Vollenberg et al. | 524/537 |

FOREIGN PATENT DOCUMENTS

| | | |
|---|---|---|
| EP | 0135493 A1 | 3/1985 |
| EP | 0142336 A1 | 5/1985 |
| EP | 0237306 A2 | 9/1987 |
| EP | 0318788 A2 | 6/1989 |
| EP | 0320651 A2 | 6/1989 |
| EP | 0413560 A2 | 2/1991 |
| EP | 0683201 A1 | 11/1995 |
| GB | 1431916 | 4/1976 |
| GB | 2048285 A | 12/1980 |

(Continued)

OTHER PUBLICATIONS

ASTM Designation: D1003-00: "Standard Test Method for Haze and Luminous Transmittance for Transparent Plastic", pp. 1-6, ASTM International, West Conshohocken, PA USA (2004).
ASTM Designation D256-04: "Standard Testing Methods for Determining the Izod Pendulum Impact Resistance of Plastics", pp. 1-20, ASTM International, West Conshohocken, PA USA (2004).

(Continued)

*Primary Examiner* — William Cheung
(74) *Attorney, Agent, or Firm* — Cantor Colburn LLP

(57) ABSTRACT

A composition comprising: a polycarbonate comprising units derived from a bisphenol cyclohexylidene of the formula:

$$\begin{array}{c} R^{c1} \quad (R^g)_t \quad R^{d1} \\ HO-\phantom{xx}-C-\phantom{xx}-OH \\ R^{c2} \quad\quad\quad R^{d2} \end{array}$$

wherein $R^{c1}$ and $R^{d1}$ are each independently $C_{1-12}$ alkyl, $R^{c2}$ and $R^{d2}$ are each independently hydrogen or $C_{1-12}$ alkyl, $R^g$ is $C_{1-12}$ alkyl or halogen, and t is 0 to 10; and a poly(ether-ester) copolymer comprising 40 to 60 wt % of polyester hard block units derived from a $C_6$-$C_{24}$ aromatic dicarboxylic acid or a $C_6$-$C_{24}$ alicyclic dicarboxylic acid and at least one glycol component, wherein when the $C_6$-$C_{24}$ aromatic dicarboxylic acid comprises terephthalic acid, isophthalic acid groups are present in an amount from 0 to 30 mole %, based on the total moles of isophthalic acid groups and terephthalic acid groups in the hard block units, and 40 to 60 wt % of polyether soft block units derived from poly(oxytetramethylene) glycol, wherein the molecular weight of the poly(oxytetramethylene) glycol groups is 300 to 1800 Daltons.

23 Claims, No Drawings

FOREIGN PATENT DOCUMENTS

| | | |
|---|---|---|
| JP | 60-127350 A | 7/1985 |
| JP | 60-127352 A | 7/1985 |
| JP | 62-084150 A | 4/1987 |
| JP | 60-65492 A | 3/1994 |
| JP | 2005-89572 A | 4/2005 |
| KR | 2001-0083551 A | 9/2001 |
| WO | 92/07034 A2 | 4/1992 |

OTHER PUBLICATIONS

International Search Report for PCT/US2010/061762, mailed Mar. 31, 2011, 4 pages.

Written Opinion of the International Searching Authority for PCT/US20101061762, mailed Mar. 31, 2011, 6 pages.

\* cited by examiner

POLYCARBONATE-POLY(ETHER-ESTER) COPOLYMER COMPOSITION, METHOD OF MANUFACTURE, AND ARTICLES THEREFROM

BACKGROUND

This disclosure relates to compositions and methods of preparation of compositions comprising transparent blends of polycarbonates and poly(ether-ester) copolymers, methods for their manufacture, and articles formed therefrom.

Polycarbonates are useful in the manufacture of articles and components for a wide range of applications, from automotive parts to electronic appliances. Because of their broad use, polycarbonates are often combined with other polymers to achieve the desired properties.

Poly(ether-ester) copolymers, sometimes referred to as thermoplastic copolyetherester (TPEE) elastomers, are a special class of elastomeric materials that can be molded using conventional molding equipment, and that exhibit the elasticity and resistance to impact and flex-fatigue of conventional cured rubbers. This combination of properties is attributable to the phase separation between the amorphous (soft) polyester units containing the polyether segments and the crystalline (hard) polyester segments. Because the immiscible segments are copolymerized into a single macromolecular backbone the necessary phase separation that occurs results in discrete domains. The amorphous soft-blocks provide the elastomeric properties of flexibility and low temperature impact, while the presence of the crystalline hard block results in discrete melting points, heat and chemical resistance, and mechanical strength. These materials are also commonly characterized by a brittleness point that is lower than those of conventional rubbers, superior resilience, low creep, and very good resistance to oils, fuels, solvents, and chemicals.

A drawback of poly(ether-ester) copolymers is their relative lack of transparency, again due to the phase separation of the segments. Blends of poly(ether-ester) copolymers with thermoplastic polymers such as polycarbonate or polyester lack transparency as well. Currently available polycarbonate-poly(ether-ester) copolymer compositions also lack room temperature impact ductility and the performance of photochromic dyes is compromised in polycarbonate-poly(ether-ester) copolymer compositions. There remains a need for polycarbonate-poly(ether-ester) copolymer compositions that are transparent, that have good room temperature impact ductility, and that maintain good photochromic dye performance. This disclosure addresses the challenge of formulating polycarbonate-poly(ether-ester) copolymer compositions to achieve the desired property balances for applications that require transparency and ductility, and in which photochromic dye performance is maximized.

BRIEF DESCRIPTION

In one aspect, a composition comprises: a polycarbonate comprising units derived from a bisphenol cyclohexylidene of the formula:

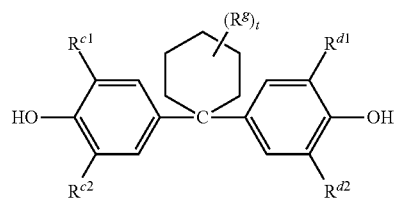

wherein $R^{c1}$ and $R^{d1}$ are each independently $C_{1-12}$ alkyl, $R^{c2}$ and $R^{d2}$ are each independently hydrogen or $C_{1-12}$ alkyl, $R^g$ is $C_{1-12}$ alkyl or halogen, and t is 0 to 10; and a poly(ether-ester) copolymer comprising 40 to 60 wt % of polyester hard block units derived from a $C_6$-$C_{24}$ aromatic dicarboxylic acid or a $C_6$-$C_{30}$ alicyclic dicarboxylic acid and at least one glycol component, wherein when the $C_6$-$C_{24}$ aromatic dicarboxylic acid comprises terephthalic acid, isophthalic acid groups are present in an amount from 0 to 30 mole %, based on the total moles of isophthalic acid groups and terephthalic acid groups in the hard block units, and 40 to 60 wt % of polyether soft block units derived from poly(oxytetramethylene) glycol, wherein the molecular weight of the poly(oxytetramethylene) glycol groups is 300 to 1800 Daltons; wherein the composition has at least 20% ductility as determined using molded 3.2 mm thick bars according to ASTM D256-02 and measured at 23° C.; and the composition has less than or equal to 20% haze as determined using a molded sample having a thickness of 3.18±0.12 mm according to ASTM D1003-00.

In other aspects, the present invention provides a composition comprising: 50 to 90 wt % of a polycarbonate copolymer comprising 45 to 55 mole % of units derived from 1,1-bis(4-hydroxy-3-methylphenyl)cyclohexane and 45 to 55 mol % of units derived from bisphenol A; and 10 to 40 wt % of a poly(ether-ester) copolymer comprising: 40 to 60 wt % of polyester hard block units derived from butane diol and, based on the moles of hard block units, 70 to 100 mole % of terephthalic acid and 0 to 30 mole % of isophthalic acid, and 40 to 60 wt % of polyether soft block units derived from poly(oxytetramethylene)glycol, wherein the molecular weight of the poly(oxytetramethylene)glycol-derived units is in the range of 900 to 1600 Daltons; wherein the composition has at least 20% ductility as determined on molded 3.2 mm thick bars according to ASTM D256-02 measured at 23° C.; and the composition has less than or equal to 20% haze as determined using a molded sample having a thickness of 3.18±0.12 mm according to ASTM D1003-00.

Within further aspects, compositions provided herein comprise: 10 to 35 wt % of a polycarbonate copolymer comprising 45 to 55 mole % of units derived from 1,1-bis(4-hydroxy-3-methylphenyl)cyclohexane and 45 to 55 mole % of units derived from bisphenol A; and 15 to 25 wt % of a poly(ether-ester) copolymer comprising: 40 to 60 wt % of polyester hard block units derived from butane diol and, based on the moles of hard block units, 70 to 100 mole % of terephthalic acid and 0 to 30 mole % of isophthalic acid, and 40 to 60 wt % of polyether soft block units derived from poly(oxytetramethylene)glycol, wherein the molecular weight of the poly(oxytetramethylene)glycol-derived units is in the range of 900 to 1600 Daltons; and 45 to 65 wt % of an aliphatic polyester having an intrinsic viscosity of greater than 0.85 dL/g; wherein the composition has at least 20% ductility as determined on 3.2 mm thick bars according to ASTM D256-02 measured at 23° C.; and the composition has less than or equal to 20% haze as determined using a molded sample having a thickness of 3.18±0.12 mm according to ASTM D1003-00.

Also provided herein, within still further aspects, are compositions that comprise, based on the total weight of the composition: 20 to 40 wt % of a polycarbonate copolymer comprising 45 to 55 mole % of units derived from 1,1-bis(4-hydroxy-3-methylphenyl)cyclohexane and 45 to 55 mol % of units derived from bisphenol A; and 10 to 40 wt % of a poly(ether-ester) copolymer comprising 40 to 60 wt % of polyester hard block units derived from butane diol and, based on the moles of hard block units, 70 to 100 mole % of terephthalic acid and 0 to 30 mole % of isophthalic acid, and 40 to 60 wt % of polyether soft block units derived from poly(oxytetramethylene)glycol, wherein the molecular weight of the poly(oxytetramethylene)glycol-derived units is in the range of 900 to 1600 Daltons; and 10 to 30 wt % of a polycarbonate that is not the same as the polycarbonate copolymer, wherein the composition has at least 20% ductility as determined on 3.2 mm thick bars according to ASTM D256-02, measured at 23° C.; and the composition has less than or equal to 20% haze as determined using a molded sample having a thickness of 3.18±0.12 mm according to ASTM D1003-00.

In another aspect, an article comprises one or more of the disclosed compositions.

In another aspect, a method of forming a composition comprises melt blending the components of the disclosed compositions.

In still another aspect, a method of forming an article comprises shaping, extruding, blow molding, or injection molding the disclosed compositions to form the article.

These and other features, aspects, and advantages of the disclosure will become better understood with reference to the following description and appended claims.

DETAILED DESCRIPTION

The inventors hereof have discovered that a combination of a bisphenol cyclohexylidene polycarbonate and a poly(ether-ester) copolymer allows manufacture of compositions having a combination of both transparency and ductility. The poly(ether-ester) copolymer comprises 40 to 60 wt % of soft block units derived from poly(oxytetramethylene) glycol, wherein the molecular weight of the poly(oxytetramethylene) glycol group is 300 to 1800 Daltons. The poly(ether-ester) copolymer further comprises 40 to 60 wt % of polyester hard block units, and low amounts of isophthalic acid units. In a particularly advantageous feature, the compositions allow excellent photochromic performance.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "and/or" includes any and all combinations of one or more of the associated listed items. The singular forms "a," "an," and "the" are intended to include the plural forms as well, unless the context clearly indicates otherwise. It will be further understood that the terms "comprises" and/or "comprising," or "includes" and/or "including" specify the presence of stated features, regions, integers, steps, operations, elements, and/or components, but do not preclude the presence or addition of one or more other features, regions, integers, steps, operations, elements, components, and/or groups thereof. Unless otherwise defined, all terms (including technical and scientific terms) used herein have the same meaning as commonly understood by one of ordinary skill in the art to which this invention belongs.

All molecular weights in this application refer to weight average molecular weights. All such mentioned molecular weights are expressed in Daltons.

All ASTM tests and data are from the 2003 edition of the Annual Book of ASTM Standards unless otherwise indicated.

The term "isophthalic acid group" means the group having the formula —OC(O)C$_6$H$_4$C(O)—, the term "terephthalic acid group" means the group having the formula —OC(O)C$_6$H$_4$C(O)—, the term "diethylene glycol group" means the group having the formula —OC$_2$H$_4$OC$_2$H$_4$—, the term "butane diol group" means the group having the formula —OC$_4$H$_8$—, the term "ethylene glycol group" means the group having formula —OC$_2$H$_4$—, and the term "poly(oxytetramethylene) glycol group" means the group having the formula —(OC$_4$H$_6$)$_n$—.

The thermoplastic compositions comprise a specific polycarbonate, together with a poly(ether-ester) copolymer. The polycarbonate has repeating units of formula (1):

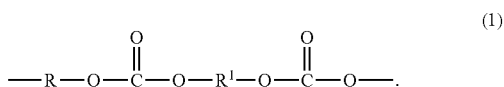

(1)

wherein the mole ratio of R:R$^1$ in the polycarbonate is 100:0 to 5:95. In formula (1), R is derived from a bisphenol cyclohexylidene of formula (2):

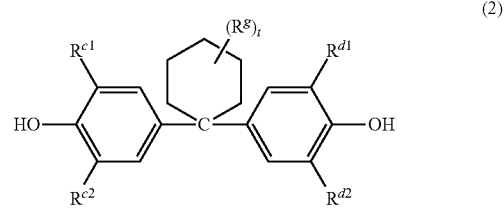

(2)

wherein R$^{c1}$ and R$^{d1}$ are each independently C$_{1-12}$ alkyl, R$^{c2}$ and R$^{d2}$ are each independently hydrogen or C$_{1-12}$ alkyl, R$^g$ is C$_{1-12}$ alkyl or halogen, and t is 0 to 10. In certain polycarbonates, R$^{c1}$ and R$^{d1}$ are each independently C$_{1-4}$ alkyl, R$^{c2}$ and R$^{d2}$ are each hydrogen, R$^g$ is C$_{1-4}$ alkyl, and t is 0 to 5. One bisphenol cyclohexylidene of formula (2) is a dimethyl bisphenol cyclohexylidene wherein R$^{c1}$ and R$^{d1}$ are each methyl, R$^{c1}$ and R$^{d1}$ are each hydrogen, and t is 0, i.e., a monomer of formula (3):

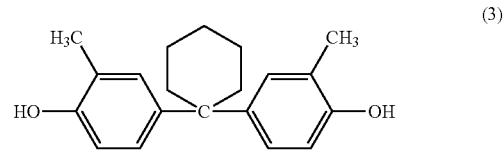

(3)

which is also known as 1,1-bis(4-hydroxy-3-methylphenyl)cyclohexane, or alternatively as dimethyl bisphenol cyclohexane (DMBPC).

Further in formula (1), R$^1$ is derived from a dihydroxy compound that is not the same as R, for example a bisphenol of the formula:

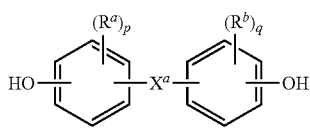

wherein $R^a$ and $R^b$ are each independently a halogen or $C_{1-12}$ alkyl group, p and q are each independently integers from 0 to 4 and $X^a$ is a single bond, —O—, —S—, —S(O)—, —S(O)$_2$—, —C(O)—, or a $C_{1-25}$ organic group. The $C_{1-25}$ organic group can be cyclic or acyclic, aromatic or non-aromatic, and can further comprise one or more heteroatoms such as halogen, oxygen, nitrogen, sulfur, silicon, phosphorous, or a combination comprising at least one of the foregoing heteroatoms. The $C_{1-25}$ organic group can be disposed such that the $C_6$ arylene groups connected thereto are each connected to a common alkylidene carbon or to different carbons of the $C_{1-25}$ organic bridging group. In one embodiment, $X^a$ is a $C_{1-18}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{6-16}$ arylene group. In any of the foregoing embodiments, p and q can each be 1, and $R^a$ and $R^b$ a $C_{1-3}$ alkyl group, specifically methyl, disposed meta to the hydroxy group on each arylene group. Alternatively, in any of the foregoing embodiments, p and q can each be 0.

Specific examples of the dihydroxy compounds that can be used to derive $R^1$ include 1,1-bis(4-hydroxyphenyl)methane, 1,1-bis(4-hydroxyphenyl)ethane, 2,2-bis(4-hydroxyphenyl) propane ("bisphenol A" or "BPA," wherein $X^a$ is isopropylidene and p and q are each zero), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine ("PPPBP"), and 9,9-bis(4-hydroxyphenyl) fluorene. A combination comprising the foregoing dihydroxy compounds can be used. In one embodiment, R is DMBPC and $R^1$ is BPA. In certain compositions, the polycarbonate of formula (1) is comprises from more than 0 to less than 50 wt %, based on the total weight of the composition.

The mole ratio of bisphenol cyclohexylidene units R to other dihydroxy units $R^1$ (e.g., BPA) in formula (1) can vary depending on the desired properties of the blend, the type of polyester used, the presence and type of additives, and other considerations. As stated above, the mole ratio of R:$R^1$ in the polycarbonates is 100:0 to 5:95, and can be 80:20 to 20:80 or 55:45 to 45:55. Within certain embodiments, the polycarbonate comprises from 45 to 55 mole % of units derived from 1,1-bis(4-hydroxy-3-methylphenyl)cyclohexane. Within other embodiments, the polycarbonate comprises from 45 to 55 mole % of units derived from 1,1-bis(4-hydroxy-3-methylphenyl)cyclohexane and from 45 to 55 mole % of units derived from BPA.

The polycarbonates can be manufactured by a variety of methods such as interfacial polymerization, melt polymerization, and solid-state polymerization. For example, the polycarbonate can be made by introducing phosgene under interfacial reaction conditions into a mixture of the dihydroxy compounds. The polymerization of the monomers can be facilitated by use of a tertiary amine catalyst or a phase transfer catalyst. Among the suitable phase transfer catalysts which can be utilized are catalysts of the formula $(R^5)_4Q^+X$, where $R^5$ is independently at each occurrence an alkyl group having 1 to 10 carbons, Q is a nitrogen or phosphorus atom, and X is a halogen atom, or an —$OR^6$ group, where $R^6$ is selected from a hydrogen, an alkyl group having 1 to 8 carbon atoms and an aryl group having 6 to 18 carbon atoms. Some of the phase transfer catalysts which can be used include [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, CH$_3$[CH$_3$(CH$_2$)$_2$]$_3$NX wherein X is selected from Cl$^-$, Br$^-$ or —$OR^6$. Mixtures of phase transfer catalysts can also be used. An effective amount of a phase transfer catalyst is greater than or equal to 0.1 weight percent (wt %) and in one embodiment greater than or equal to 0.5 wt % based on the weight of bisphenol in the phosgenation mixture. The amount of phase transfer catalyst can be less than or equal to 10 wt % and more specifically less than or equal to 2 wt % based on the weight of bisphenol in the phosgenation mixture.

Branched polycarbonates as well as blends of linear polycarbonate(s) and branched polycarbonate(s) can be used. The branched polycarbonates can be prepared by adding a branching agent during polymerization. These branching agents are well known and can comprise polyfunctional organic compounds containing at least three functional groups, which can be hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Branching agents and procedures for making branched polycarbonates are described in U.S. Pat. Nos. 3,635,895 and 4,001,184. Many types of polycarbonates end groups can be used in the polycarbonate composition.

The average molecular weight of the polycarbonate can be, for example, from 5,000 to 100,000 Daltons, from 10,000 to 65,000 Daltons, or from 15,000 to 35,000 Daltons.

The poly(ether-ester) copolymer is a segmented block copolymer comprising hard-blocks and soft-blocks. The hard-blocks are crystallizable materials that provide the physical integrity, heat resistance, and chemical resistance, and the soft-blocks provide the elastomeric properties. In general, the Tm of the hard block can be 120 to 200° C., or from 150 to 195° C., and Tg of the soft block can be −25 to −85° C., or from −45 to −65° C.

The hard block units of the poly(ether-ester) copolymers are derived from the reaction of a dicarboxylic acid component (which as used herein includes chemical equivalents thereof, for example acid chlorides) with a short chain $C_{1-10}$ diol component (which as used herein includes chemical equivalents thereof, for example methyl esters).

In certain embodiments, the hard block units of the poly (ether-ester) copolymer are derived from a $C_6$-$C_{24}$ aromatic dicarboxylic acid. Examples of aromatic dicarboxylic acids include isophthalic acid, terephthalic acid, 1,2-di(p-carboxyphenyl)ethane, 4,4'-dicarboxydiphenyl ether, and 4,4'-bisbenzoic acid. Acids containing fused rings can also be present, such as in 1,4-, 1,5-, or 2,6-naphthalenedicarboxylic acids. Representative aromatic dicarboxylic acids include $C_6$ aromatic dicarboxylic acids. When the aromatic dicarboxylic acid component comprises terephthalic acid, isophthalic acid is present in an amount from 0 to 30 mole %, (e.g., 15 to 25 mole %), based on the total moles of isophthalic acid groups and terephthalic acid groups in the hard block units. In one embodiment, the aromatic hard block units comprise 70 to 100 mole % of terephthalic acid groups and 0 to 30 mole % of isophthalic acid groups.

In other embodiments, the hard block units of the poly (ether-ester) copolymer are derived from a $C_6$-$C_{30}$ alicyclic dicarboxylic acid. Examples of alicyclic dicarboxylic acids include the various isomers of 1,4-cyclohexane dicarboxylic acid (cis, trans, or a combination thereof), 1,4-cyclohexane dicarboxylic acid (cis, trans, or a combination thereof), 1,3-cyclohexane dicarboxylic acid (cis, trans, or a combination thereof), 1,2-cyclohexane dicarboxylic acid (cis, trans, or a combination thereof), and the various isomers of decalin dicarboxylic acid, norbornane dicarboxylic acid, adamantane dicarboxylic acid, and tricyclodecene-dicarboxylic acid The short chain $C_{1-10}$ diol component can comprise, for example, ethylene glycol, diethylene glycol, trimethylene glycol, 1,3-propane diol, 1,4-butane diol, or a combination comprising one or more of the foregoing $C_{1-10}$ diols. In one embodiment, 1,4-butane diol alone is used. In another embodiment, the short chain $C_{1-10}$ diol component comprises, in addition to 1,4-butanediol, diethylene glycol and ethylene glycol monomers that are added during the polymerization. The amount of such monomers can vary, depending on the application. For example, the diethylene glycol groups and ethylene glycol groups can be present in an amount of more than 0 to 5 wt % ethylene glycol and more than 0 to 5 wt % diethylene glycol. In certain embodiments, diethylene glycol is present in an amount from 0.02 to 2 wt %, based on the weight of the hard-blocks.

Specific hard block units comprise, consist essentially of, or consist of ester units containing 1,4-butane diol groups, together with 70 to 100 mole % of terephthalic acid groups and 0 to 30 mole % of isophthalic acid groups, based on the total moles of hard block ester units.

The soft block units are formed by the reaction of a dicarboxylic acid component (which as used herein includes chemical equivalents thereof, for example acid chlorides) with a poly(oxyalkylene) diol component (which as used herein includes chemical equivalents thereof, for example methyl esters).

The dicarboxylic acid component used to manufacture the soft block units comprises one or more dicarboxylic acids. In certain embodiments, the dicarboxylic acids contain a $C_{2-30}$ alkylene group, a $C_{6-30}$ alicyclic group, a $C_{6-30}$ alkyl aromatic group, and/or a $C_{6-30}$ aromatic group. Examples of aromatic dicarboxylic acids include isophthalic acid, terephthalic acid, 1,2-di(p-carboxyphenyl)ethane, 4,4'-dicarboxydiphenyl ether, and 4,4'-bisbenzoic acid. Acids containing fused rings can also be present, such as in 1,4-, 1,5-, or 2,6-naphthalene-dicarboxylic acids. Representative dicarboxylic acids include terephthalic acid, isophthalic acid, naphthalene dicarboxylic acid, and cyclohexane dicarboxylic acid. Terephthalic acid can be used alone, or in combination with isophthalic acid.

The poly(oxyalkylene) diol is poly(oxytetramethylene) glycol (PTHF). The poly(ether-ester) copolymers can comprise from 10 to 73 wt %, from 20 to 65 wt %, or from 40 to 60 wt %), of poly(oxytetramethylene) glycol groups, based on the weight of the copolymer. It has been found that both transparency and good ductility are achieved when the poly (oxytetramethylene) glycol groups have a molecular weight of 300 to 1800 Daltons; in certain embodiments, the poly (oxytetramethylene) glycol groups have a molecular weight from 700 to 1700 Daltons or from 900 to 1600 Daltons.

As illustrated in detail in the Examples below, advantageous properties are obtained when the poly(ether-ester) contains from 40 to 60 wt % of hard block units and from 40 to 60 wt % of soft block units, based on the total weight of the copolymer. In certain compositions, the poly(ether-ester) copolymer comprises 40 to 50 wt %, based on the weight of the poly(ether-ester), of units derived from poly(oxytetramethylene)glycol.

In summary, the poly(ether-ester) copolymer comprises (1) in the hard block, 0 to 30 mole % of isophthalate units, based on the total moles of isophthalic acid groups and terephthalic acid groups in the hard block; (2) poly(oxytetramethylene) glycol groups in the soft block having a molecular weight of 300 to 1800; (3) and from 40 to 60 wt % of hard block units and from 40 to 60 wt % of soft block units, based on the total weight of the copolymer.

A variety of poly(ether-ester) copolymers are commercially available, for example under the trademarks ARNITEL EM400 and ARNITEL EL630 poly(ether-ester) copolymers from DSM; HYTREL 3078, HYTREL 4056, HYTREL 4556, and HYTREL 6356 poly(ether-ester) copolymers from DuPont; and ECDEL 9966 poly(ether-ester) copolymer from Eastman Chemical. In all cases, the soft block is derived from tetrahydrofuran. In the HYTREL 4556, HYTREL 6356, ARNITEL EM400, and ARNITEL EL630 poly(ether-ester) copolymers, the hard block is based on poly(butylene terephthalate) (PBT). In the HYTREL 4056 poly(ester-ether) copolymer, the hard block contains isophthalate units in addition to terephthalate units. In the ECDEL 9966 poly(ether-ester) copolymer, the hard block is based on poly(1,4-cyclohexane-dimethanol-1,4-cyclohexane dicarboxylate) (PCCD) units.

Other polymers can optionally be used in combination with the polycarbonate of formula (1) and the poly(ether-ester) copolymer, in amounts of more than 0 to 70 wt %, from 20 to 60 wt %, from 25 to 75 wt %, or from 45 to 55 wt %), based on the total weight of the composition. Examples of these other polymers are homopolyesters, copolyesters that are not the poly(ether-ester) copolymers described above, polysulfones, polyethersulfones, polyimides, polyetherimides, polyphenylene ethers, and impact modifiers. Other exemplary additional polymers include polycarbonates that are not the same as those of formula (1) (i.e., are different from the polycarbonate copolymer comprising the units derived from bisphenol cyclohexylidene), for example a homopolymer comprising units derived from bisphenol A (the homopolycarbonate of BPA), and polycarbonates containing ester units or polysiloxane units.

In one embodiment, the composition comprises from 0 to 70 wt % or more, (e.g., from 25 to 75 wt %, or from 45 to 55 wt %), of an aliphatic polyester that is not the same as the poly(ether-ester) copolymers. Certain suitable aliphatic esters have an intrinsic viscosity of more than 0.85 dL/g. The aliphatic ester is typically the ester condensation product of a $C_3$-$C_{12}$ aliphatic diacid or chemical equivalent thereof (such as the salts, esters or acid halides thereof), and $C_2$-$C_{12}$ straight chain, branched, or cyclic aliphatic diols or chemical equivalents thereof (such as dialkylesters or diaryl esters thereof). Exemplary diols include ethylene glycol, 1,2- and 1,3-propylene glycol, 1,3- and 1,4-butane diol, diethylene glycol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol, and particularly its cis- and trans-isomers, and mixtures of any of the foregoing. Exemplary diacids are cycloaliphatic diacids, which includes cyclo or bicyclo aliphatic acids, for example, decahydro naphthalene dicarboxylic acids, norbornene dicarboxylic acids, bicyclo octane dicarboxylic acids, and 1,4-cyclohexane dicarboxylic acids. In certain compositions provided herein, cycloaliphatic polyesters are used, containing at least 80 mole % of cycloaliphatic diacid and/or diol units, the remainder, if any, being linear aliphatic diacids and/or diols. Specific cycloaliphatic polyesters for use in the compositions include condensation products of the 1,4-cyclohexane diacids with 1,4-cyclohexane primary diols such as 1,4-cyclohexane dimethanol, i.e., poly(1,4-cyclohexane-dimethanol-1,4-cyclohexane dicarboxylate) (PCCD).

The composition can comprise from 0 to 50 wt %, from 1 to 40 wt % or from 10 to 30 wt % of a polycarbonate that is not the same as the polycarbonate of formula (1), such as a homopolycarbonate of bisphenol A, a polycarbonate having ester repeat units, a polycarbonate having polysiloxane repeat units, or a combination comprising one or more of the foregoing polycarbonates. In one embodiment, the polycarbonate that is not a polycarbonate of formula (1) is a homopolycarbonate of bisphenol A having a melt flow rate 12 at 250° C. and 1.2 kgf.

In addition, or in the alternative, the composition comprises more than 0 to 50 wt %, from 2 to 30 wt %, or 5 to 20 wt % of an impact modifier, based on the total weight of the composition. Exemplary impact modifiers include a natural rubber, low-density polyethylene, high-density polyethylene, polypropylene, polystyrene, polybutadiene, styrene-butadiene copolymer, styrene-butadiene-styrene copolymer, styrene-ethylene-butadiene-styrene copolymer, acrylonitrile-butadiene-styrene copolymer, acrylonitrile-ethylene-propylene-diene-styrene copolymer, styrene-isoprene-styrene copolymer, methyl methacrylate-butadiene-styrene copolymer, styrene-acrylonitrile copolymer, ethylene-propylene copolymer, ethylene-propylene-diene copolymer, ethylene-methyl acrylate copolymer, ethylene-ethyl acrylate copolymer, ethylene-vinyl acetate copolymer, ethylene-glycidyl methacrylate copolymer, ethylene-glycidyl methacrylate-methacrylate copolymer, a silicone, or a combination comprising at least one of the foregoing impact modifiers.

The compositions can optionally further comprise any of the additives and property modifiers that polycarbonates and poly(ether-ester) copolymers are usually combined with, with the proviso that the additives are selected so as to not significantly adversely affect the desired properties of the composition, for example, transparency and ductility. Exemplary additives include colorants, dyes, stabilizers, UV absorbers, heat stabilizers, antioxidants, flame retardants, plasticizers, lubricants, antistatic agents, mold release agents, quenchers, and the like.

The compositions can optionally comprise a colorant such as a pigment and/or dye additive. Exemplary pigments include, inorganic pigments such as metal oxides such as zinc oxide, titanium dioxides, iron oxides, and the like; mixed metal oxides; sulfides such as zinc sulfides and the like; aluminates; sodium sulfo-silicates, sulfates, chromates, and the like; carbon blacks; zinc ferrites; ultramarine blue; Pigment Brown 24; Pigment Red 101; Pigment Yellow 119; Pigment Blue 28; organic pigments such as azos, di-azos, quinacridones, perylenes, naphthalene tetracarboxylic acids, flavanthrones, isoindolinones, tetrachloroisoindolinones, anthraquinones, anthranthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Blue 15:4, Pigment Green 7, Pigment Yellow 147 and Pigment Yellow 150; and thermochromic pigments. Combinations comprising at least one of the foregoing pigments can be used. Pigments can be used in amounts of 0.01 to 10 weight percent, based on the total weight of the composition. Light diffusers, which are acrylic-based or silica-based can also be used.

Exemplary dyes include coumarin dyes such as coumarin 460 (blue), coumarin 6 (green), and nile red; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes; thioindigoid dyes; diazonium dyes; nitro dyes; quinone imine dyes; aminoketone dyes; tetrazolium dyes; thiazole dyes; perylene dyes; perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes that absorb in the near infrared wavelength and emit in the visible wavelength; fluorophores such as 3-hydroxychromone dyes, for example 3-hydroxy-2-(4-biphenyl)-chromen-4-one and 3,7-dihydroxy-2,8-diphenyl-4H,6H-pyrano[3,2-g]chromene-4,6-dione; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3',5'-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene; leuco dyes; and thermochromic dyes. A combination comprising at least one dye can be used, as well as a combination comprising at least one dye and a pigment. Dyes can be used in amounts of 0.01 to 10 wt %, based on the total weight of the composition.

Photochromic dyes can also be used. Photochromic dyes are light absorbing compounds that can absorb at least a portion of activating light directed to the composition containing the dye. Exemplary photochromic dyes include benzopyrans; napthopyrans; spironapthopyrans; spironaphthoxazines; spiro(indolino)naphthoxazines; spiro(benzindolino) naphthoxazines; spiro(indolino)pyridobenzoxazines; spiro (benzindolino)pyridobenzoxazines; spiro(benzindolino) naphthopyrans; spiro(indolino)benzoxazines; spiro (indolino)benzopyrans; spiro(indolino)naphthopyrans; spiro (indolino)quinopyrans; organo-metal dithiazonates, for example (arylazo)thioformic arylhydrazidates; diarylethenes; fulgides and fulgimides, for example 3-furyl, 3-thienyl, and 3-pyrryl fulgides and fulgimides; and spirodihydroindolizines. Combinations comprising at least one photochromic dye can be used. Specific examples of photochromic dyes include Variacrol Yellow, a napthopyran dye, and Variacrol Blue D, which are spironaphthoxazines, commercially available from Great Lakes Chemical in West Lafayette, Ind.; Reversacol Corn Yellow and Reversacol Berry Red and Reversacol Midnight Grey, which are napthopyrans, and Reversacol Sea Green, Reversacol Plum Red, and Reversacol Palatinate Purple and Reversacol Oxford Blue, which are spironaphthoxazines, commercially available from Keystone Aniline Corporation in Chicago, Ill.; and CH-94 and CH-266, which are benzopyrans, commercially available from Chroma Chemicals in Dayton, Ohio. The total amount of photochromic dyes in the composition can be from 1 ppm to 1000 ppm, based on the total parts of the composition by weight.

The compositions can, optionally, further comprise an antioxidant stabilizer, for example a composition comprising a hindered diol stabilizer, a thioester stabilizer, an amine stabilizer, a phosphite stabilizer, or a combination comprising at least one of the foregoing types of stabilizers. Exemplary antioxidants are organophosphites such as tris(2,6-di-tert-butylphenyl)phosphite, tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane (commercially available from Geigy Chemical Company as IRGANOX™ 1010); butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate, pentaerythrityl-tetrakis(beta-lauryl thiopropionate) (commercially available from Crompton Corporation as SEENOX 412S); and amides of beta-(3,5-di-tert-butyl-4-hydroxyphenyl)-propionic acid. Combinations comprising at least one antioxidant can be used. One exemplary antioxidant composition comprises tetrakis(2,4-di-tert-butylphenyl) 4,4'-biphenylene diphosphonite (commercially available from Clariant as SANDOSTAB® P-EPQ). Tetrakis(2,4-di-tert-butylphenyl) 4,4'-biphenylene diphosphonite and phosphoric acid can also be used, in a weight ratio of 80:20 to 20:80, specifically 70:30 to 30:70. The antioxidant composition can also consist essentially of, or consist of, tetrakis[methylene(3,5-di-tert-butyl-4-hydroxyhydrocinnamate)]methane and pentaerythrityl-tetrakis(beta-lauryl thiopropionate), in a weight ratio of 30:60 to 70:30, specifically 40:60 to 60:40. When present, the antioxidants are used in an amount from 0.0001 wt % to 4 wt %, or from 0.01 wt % to 2 wt %, from 0.1 to 1.2 wt %, based on the total weight of the composition.

In certain embodiments, the compositions further comprise a quencher. Quenchers are agents that inhibit activity of any catalysts present in the composition, to prevent accelerated interpolymerization and degradation of the polymers in the composition. Some quenchers, for example phosphites, can also provide additional desirable properties, e.g., thermal stability and/or processing stability. The suitability of a particular compound for use as a quencher and the determination of how much is to be used as a quencher can be readily determined by preparing a mixture of the polymers and determining the effect on melt viscosity, gas generation, color stability, or the formation of interpolymer. Combinations of quenchers can be used. For example, the compositions can comprise at least two quenchers, selected phosphorous containing compounds, boric acids, aliphatic or aromatic carboxylic acids (i.e., organic compounds comprising at least one carboxy group), anhydrides, polyols, and epoxy polymers.

Exemplary quenchers include phosphorus-containing derivatives, such as acidic phosphate salts (e.g., Group IB or Group IIB metal phosphate salts), oxo acids of phosphorus (such as phosphorous acid, phosphoric acid, polyphosphoric acid, hypophosphorous acid, metaphosphoric acids and metal polyacid pyrophosphates), and acidic organophosphorus compounds, such as diphosphites (including acid, alkyl, aryl or mixed phosphites having at least one acidic hydrogen), phosphonates, phosphites, arylphosphinic acids, and arylphosphonic acids. Specific acidic phosphate salts include sodium dihydrogen phosphate, mono zinc phosphate, potassium hydrogen phosphate, calcium dihydrogen phosphate, and the like, and phosphate salts of a Group IB or Group IIB metal including zinc phosphate and the like. The metal polyacid pyrophosphates are of the formula $M_{zx}H_yP_nO_{3n+1}$ wherein M is a metal (specifically an alkaline or alkaline earth metal), x is a number from 1 to 12 and y is a number 1 to 12, n is a number from 2 to 10, z is a number from 1 to 5 and the sum of $(zx)+y$ is equal to $n+2$. The phosphites are of the formula $P(OR^{13})(OR^{14})(OR^{15})$, where $R^{13}$, $R^{14}$, and $R^{15}$ are each independently hydrogen, $C_{1-12}$ alkyl, or $C_{6-12}$ aryl with the proviso that at least one of $R^{13}$, $R^{14}$, and $R^{15}$ is hydrogen.

Another exemplary quencher is a polyol of the formula $R^{16}(OH)_r$, wherein each $R^{16}$ is independently a substituted or unsubstituted $C_{2-20}$ aliphatic moiety, a substituted or unsubstituted $C_{7-24}$ aliphatic-aromatic moiety, and r is a positive integer having a value of from 2 up to the number of replaceable hydrogen atoms present on $R^{16}$, specifically having a value of from 2 to 12. In one embodiment, $R^{16}$ is a substituted or unsubstituted $C_{7-12}$ aliphatic-aromatic moiety wherein the hydroxyl groups are bonded to the aliphatic portion of the moiety. The aromatic portion can contain from 6 to 12 ring carbon atoms, which include, but are not limited to, phenyl, naphthyl, and biphenyl, and an aliphatic portion bonded to the ring carbon atoms of the aromatic portion, with the hydroxyl groups being present only on the aliphatic portion. Alternatively, each $R^{16}$ is a substituted or unsubstituted $C_{2-20}$ aliphatic moiety (either straight or branched chain), such as an acylic aliphatic group or a $C_{3-20}$ cycloaliphatic moiety, specifically a cyclic aliphatic moieties containing from 4 to 8 ring carbon atoms. The cyclic aliphatic moieties can contain alkyl substituent groups on the ring carbon atoms, and the hydroxyl groups can be bonded to either the ring carbon atoms or to the alkyl substituent groups, or to both. Specific polyol include the acylic aliphatic polyhydric alkenols, such as the hexahedra alkenols. Specific polyols of this type are those wherein the hydroxyl groups are bonded to different carbon atoms of the acylic aliphatic moiety, for example cyclohexane dimethanol, butanediol, mannitol, sorbitol, 1,3-propanediol, glycerol, 1,2-cyclopentanediol, 1,3,5-cyclohexanediol, 1,2,3, 4,5-penta-hydroxypentane, and 1,1,2,2-tetrahydroxyethane.

The quencher can also be a carboxylic acid derivative of the formula:

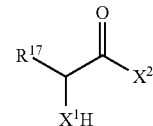

wherein $X^1$ is either a direct bond or NH, $X^2$ is either $OR^{18}$ or $NHR^{18}$ and is always $OR^{18}$ when $X_1$ is NH. $R^{18}$ is hydrogen, $C_{1-10}$ alkyl, or $C_{3-12}$ aryl. In one embodiment Z is CH or a substituted or unsubstituted aromatic carbocyclic radical. $R^{17}$ is either hydrogen or a substituted or unsubstituted hydrocarbon moiety, specifically hydrogen, $C_{1-20}$ alkyl, or $C_{6-20}$ aryl radical that can contain substituents such as hydroxy, carboxy and carbalkoxy. In one embodiment the carbalkoxy radical is $OR^{18}$.

Other types of quenchers include substituted carboxylic acid derivatives, for example alpha-hydroxy, or alpha-amino aliphatic acid derivatives or o-hydroxy or o-amino aromatic acid derivatives. Illustrative compounds of this type are alkyl salicylate (for example methyl salicylate and ethyl salicylate), aryl salicylate, salicylamide, glycine, malic acid, mandelic acid, and dibutyl tartrate.

The amount of the quencher added to the composition is an amount that is effective to stabilize the composition, for example 0.001 to 0.5 wt %, specifically 0.01 to 0.1 wt %, based on the total weight of the composition. The amount of quencher can also be 25 to 2000 parts per million, specifically 50 to 1500 parts per million, each based on the total parts by weight of the polymers used in the composition. In general, if less than 0.001 wt % of quencher mixture is present, there is no appreciable stabilization of the thermoplastic composition. If a large amount of the quencher is used than some of the advantageous properties of the composition can be adversely affected. The amount of quencher used is thus an amount which is effective to stabilize the composition therein but insufficient to substantially deleteriously affect most of the advantageous properties of the composition.

The composition can also optionally comprise a carboxy-reactive material. The carboxy-reactive material is monofunctional or polyfunctional, and can be either polymeric or non-polymeric. Examples of carboxy-reactive materials include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the poly(ether-ester) copolymer.

The term "polyfunctional" or "multifunctional" in connection with the carboxy-reactive material means that at least two carboxy-reactive groups are present in each molecule of the material. Particularly useful polyfunctional carboxy-reactive materials include compounds with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least 10, for example, or greater than 15, or greater than 20. These copolymers generally have a molecular weight greater than 3000, specifically greater than 4000, and more specifically greater than 6000. These copolymers are commercially available from Johnson Polymer, LLC under the JONCRYL® trademark. A specific example is JONCRYL® ADR 4368 copolymer.

Another example of a carboxy-reactive material is the reaction product of an epoxy-functional $C_{1-4}$(alkyl)acrylic monomer with a non-functional styrenic and/or $C_{1-4}$(alkyl)acrylate and/or olefin monomer. In one embodiment the epoxy polymer is the reaction product of an epoxy-functional (meth)acrylic monomer and a non-functional styrenic and/or (meth)acrylate monomer. These carboxy-reactive materials are characterized by relatively low molecular weights. In another embodiment, the carboxy-reactive material is an epoxy-functional styrene-(meth)acrylic copolymer produced from an epoxy functional (meth)acrylic monomer and styrene. As used herein, the term "(meth)acrylic" includes both acrylic and methacrylic monomers, and the term "(meth)acrylate" includes both acrylate and methacrylate monomers. Examples of specific epoxy-functional (meth)acrylic monomers include, but are not limited to, those containing 1,2-epoxy groups such as glycidyl acrylate and glycidyl methacrylate.

Exemplary $C_{1-4}$(alkyl)acrylate comonomers include acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Exemplary styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy-reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below 1000 g/mole, to facilitate blending with the poly(ether-ester) copolymer. In one embodiment the difunctional epoxy compounds have at least one of the epoxide groups on a cyclohexane ring. Exemplary difunctional epoxy compounds include 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. A specific example is 3,4-epoxycyclohexyl-3,4-epoxycyclohexyl carboxylate.

Other polyfunctional carboxy-reactive materials having multiple epoxy groups are acrylic and/or polyolefin copolymers and oligomers containing glycidyl groups incorporated as side chains. Exemplary epoxy-functional materials of this type include D.E.R. 332, D.E.R. 661, D.E.R. 667, ERL-4221, and ERL-4299 from Dow Chemical Company; EPON Resin 1001F, 1004F, 1005F, 1007F, and 1009F from Resolution Performance Products; EPON 826, 828, and 871 from Shell Oil Corporation; and CY-182 and CY-183 from Ciba-Giegy Corporation. A further example of a polyfunctional carboxy-reactive material is a co- or terpolymer including units of ethylene and glycidyl methacrylate (GMA), sold by Arkema under the trademark LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like. Examples of such multifunctional carboxy-reactive materials include materials with a combination of epoxy and silane functional groups, specifically terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the formula:

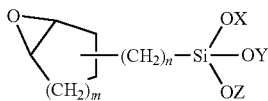

wherein m is an integer of 1, 2 or 3, n is an integer of 1 to 6, inclusive, and X, Y, and Z are the same or different, specifically the same, and are $C_{1-20}$ alkyl, $C_{4-10}$ cycloalkyl, ($C_{1-10}$alkylene)phenyl, and phenylene($C_{1-16}$alkyl). Specific epoxy silanes of this type are compounds wherein m is 2, n is 1 or 2, specifically 2, and X, Y, and Z are the same and are $C_{1-3}$ alkyl. More specifically, epoxy silanes can be used wherein m is 2, n is 2, and X, Y, and Z are the same and are methyl or ethyl. Such materials include, for example, β-(3,4-epoxycyclohexyl)ethyltriethoxysilane, β-(3,4-epoxycyclohexyl)ethyltrimethoxysilane; and 3-glycidoxypropyltriethoxysilane.

The specific type and amount of the carboxy-reactive material used depends on the desired characteristics of the composition, the type of poly(ether-ester) copolymer, the type, and amount of other additives present in the composition, and like considerations. The carboxy-reactive material is generally added to the compositions in an amount effective to improve visual and/or measured physical properties. In one embodiment, the carboxy-reactive materials are added to the composition in an amount effective to improve the solvent resistance of the composition, in particular the fuel-resistance of the composition. A person skilled in the art can determine the optimum type and amount of any given carboxy-reactive material without undue experimentation, using the guidelines provided herein. For example, a carboxy-reactive material is generally present in an amount of 0.01 to 30 wt %, specifically 0.1 to 20 wt %, each based on the total weight of the composition.

The above compositions (or articles prepared therefrom) exhibit a number of desirable properties, including improved transparency and ductility. Specifically, the composition has less than or equal to 20% haze, when measured at a thickness of 3.18±0.12 mm according to ASTM D1003-00. In another embodiment, when the polycarbonate contains 48 to 52 mole % of units derived from 1,1-bis(4-hydroxy-3-methylphenyl)cyclohexane, the composition has less than or equal to 20% haze, when measured at a thickness of 3.18±0.12 mm according to ASTM D1003-00.

Further in either of the above embodiments, the composition has at least 20% ductility as determined using five 3.2 mm thick bars per ASTM D256-02, measured at 23° C.

In a particularly advantageous feature, the compositions can contain a photochromic dye and maintain both transparency and ductility. Further, when the composition comprises a photochromic dye, thermochromic dye, thermochromic pigment, or combination thereof, an article molded from the composition, when exposed to ultra violet light for 30 seconds, exhibits a reversible decrease in visible light transmission, measured as a change in Y (ΔY; initial % T when unexposed to % T when exposed) that is more than 17, more than 20, more than 25, more than 30, or more than 35. Alternatively, the reversible decrease in visible light transmission, measured as a change in Y can be from 20 to 45, from 20 to 35, from 20 to 30, or from 20 to 25.

One or more of the foregoing properties are obtained using a composition comprising at least 40 wt % of the polycarbonate copolymer of formula (1) and more than 0 to 60 wt % of the poly(ether-ester) copolymer. Within certain embodiments, the composition comprises from 40 to 50 wt % of the polycarbonate, and from 50 60 wt % of the poly(ether-ester) copolymer. In other embodiments the composition comprises from 40 to 60 wt % of the polycarbonate and from 40 to 60 wt % of the poly(ether-ester) copolymer. Each of the foregoing amounts is based on the total weight of the composition. Further, the poly(ether-ester) copolymers contain from 40 to 60 wt % of the soft block; 0 to 30 mole % of isophthalate units, based on the total moles of ester units in the hard-block; and a molecular weight of the PTHF groups in the soft-block from 300 to 1800 Daltons.

In a specific embodiment, the composition comprises 60 to 90 wt % of a polycarbonate copolymer comprising 45 to 55 mole % of units derived from 1,1-bis(4-hydroxy-3-methylphenyl)cyclohexane and 45 to 55 mol % of units derived from bisphenol A; and 10 to 40 wt % of a poly(ether-ester) copolymer comprising 40 to 60 wt % of polyester hard block units derived from butane diol and, based on the moles of hard block units, 70 to 100 mole % of terephthalic acid and 0 to 30 mole % of isophthalic acid, and 40 to 60 wt % of polyether soft block units derived from poly(oxytetramethylene)glycol, wherein the molecular weight of the poly(oxytetramethylene) glycol-derived units is from 900 to 1600 Daltons; wherein the composition has at least 20% ductility as determined on molded 3.2 mm thick bars according to ASTM D256-02 measured at 23° C. The composition can have less than or equal to 20% haze as determined using a molded sample having a thickness of 3.18±0.12 mm according to ASTM D1003-00.

In another embodiment, a composition comprises more than 0 to 35 wt % of the polycarbonate copolymer of formula (1), 5 to 35 wt % of the poly(ester-ether) copolymer, and 45 to 55 wt % of an aliphatic polyester, for example an aliphatic polyester having a intrinsic viscosity of more than about 0.85 dL/g such as PCCD. Each of the foregoing amounts is based on the total weight of the composition. The poly(ether-ester) copolymer contains (1) from 40 to 60 wt % of the PTHF soft block; (2) in the hard block, 0 to 30 mole % of isophthalate units based on the total moles of terephthalic acid groups and isophthalic acid groups in the hard block units; and (3) a molecular weight of the PTHF soft block from 300 to 1800.

In another specific embodiment, the composition comprises: 10 to 35 wt % of a polycarbonate copolymer comprising 45 to 55 mole % of units derived from 1,1-bis(4-hydroxy-3-methylphenyl)cyclohexane and 45 to 55 mol % of units derived from bisphenol A; 15 to 25 wt % of a poly(ether-ester) copolymer comprising 40 to 60 wt % of polyester hard block units derived from butane diol and, based on the moles of hard block units, 70 to 100 mole % of terephthalic acid groups and 0 to 30 mole % of isophthalic acid groups, and 40 to 60 wt % of polyether soft block units derived from poly(oxytetramethylene)glycol, wherein the molecular weight of the poly(oxytetramethylene)glycol-derived units is from 900 to 1600 Daltons; and 45 to 65 wt % of an aliphatic polyester having an intrinsic viscosity of greater than 0.85 dL/g; wherein the composition has at least 20% ductility as determined on 3.2 mm thick bars according to ASTM D256-02 measured at 23° C.; and the composition has less than or equal to 20% haze as determined using a molded sample having a thickness of 3.18±0.12 mm according to ASTM D1003-00.

In still another embodiment, the composition comprises, based on the total weight of the composition, more than 0 to 40 wt % of the polycarbonate copolymer of formula (1), 5 to 35 wt % of the poly(ester-ether) copolymer, and from more than zero to less than 50 wt % of a polycarbonate that is not the same as the polycarbonate of formula (1) based on the total weight of the polycarbonates. A bisphenol A homopolycarbonate can be used, for example. As stated above, the poly(ether-ester) copolymer contains (1) from 40 to 60 wt % of the PTHF soft-block; (2) in the hard-block, 0 to 30 mole % of isophthalic acid groups based on the total moles of terephthalic acid groups and isophthalic acid groups in the hard block units; and (3) a molecular weight of the PTHF soft block from 300 to 1800.

In another embodiment, a composition comprises, based on the total weight of the composition: 20 to 40 wt % of a polycarbonate copolymer comprising 45 to 55 mole % of units derived from 1,1-bis(4-hydroxy-3-methylphenyl)cyclohexane and 45 to 55 mol % of units derived from bisphenol A; 10 to 40 wt % of a poly(ether-ester) copolymer comprising 40 to 60 wt % of polyester hard block units derived from butane diol and, based on the moles of hard block units, 70 to 100 mole % of terephthalic acid groups and 0 to 30 mole % of isophthalic acid groups, and 40 to 60 wt % of polyether soft block units derived from poly(oxytetramethylene)glycol, wherein the molecular weight of the poly(oxytetramethylene)glycol-derived units is from 900 to 1600 Daltons; and 10 to 30 wt % of a polycarbonate that is not the same as the polycarbonate copolymer. The composition can have at least 20% ductility as determined on 3.2 mm thick bars according to ASTM D256-02, measured at 23° C.; and the composition has less than or equal to 20% haze as determined using a molded sample having a thickness of 3.18±0.12 mm according to ASTM D1003-00.

The thermoplastic composition can be manufactured by methods generally available in the art, for example, melt blending the disclosed compositions in an extruder. In an embodiment, in one manner of proceeding, powdered polycarbonate, poly(ether-ester) copolymer, any additional polymer, and optionally other additives are first combined, for example in a HENSCHEL-Mixer® high speed mixer. Other low shear processes including but not limited to hand mixing can also accomplish this combining. The combination is then fed into the throat of an extruder, e.g., a twin-screw extruder via a hopper. Alternatively, at least one of the components can be incorporated into the composition by feeding directly into the extruder at the throat and/or downstream through a side-stuffer. The polyester components can be pre-blended with the carboxy-reactive compound and optional catalyst, and then combined with other additives. The extruder is generally operated at a temperature higher than that necessary to cause the composition to flow, e.g., at a temperature of 160 to 270° C., specifically 180 to 260° C., more specifically 190 to 250° C., wherein the die temperature can be different. The extrudate is immediately quenched in a water batch and pelletized. The pellets, so prepared, when cutting the extrudate can be one-fourth inch long or less as desired. Such pellets can be used for subsequent molding, shaping, or forming The compositions can be used as a carrier material for colorants, dyes, photochromic dyes and/or other temperature sensitive additives that require compounding, injection molding or other forms of processing at temperatures below an upper limit of 300° C., specifically below 250° C.

The compositions can also be formed, shaped, or molded into articles using thermoplastic processes such as shaping, film and sheet extrusion, injection molding, gas-assist injection molding, extrusion molding, compression molding, blow molding, and the like. The resulting articles may, for example, be in the form of a film (e.g., a solvent cast film for an overmolded article), sheet, molded object or fiber. Representative films or sheets include, for example, window glazing.

It has been found that the compositions can be advantageously heat processed, e.g., injection molded, at a temperature that is more than 0° C. and less than 300° C., at a temperature that is more than 0° C. and less than 275° C., or at a temperature that is more than 0 and less than 250° C. Such temperatures are especially advantageous when the composition contains an additive selected from the group consisting of colorants, dyes, stabilizers, UV absorbers, and heat stabilizers. These low heat processing temperatures are especially advantageous where photochromic or thermochromic pigments or dyes are used, and can be used produce transparent articles.

The compositions can further be used to form a component of an article. For example, the composition can be formed into a film or sheet, and used as a single layer, or as a layer in combination with an article.

The films or sheets comprising the composition are of particular utility in multilayer articles comprising a substrate and one or more films or sheets disposed on the substrate. Other thermoplastic elastomer compositions can be used as the substrate, for example polycarbonate, polyester, polysulfone, and others. Single or multiple layers of coatings can further be applied to the substrate and/or to the one or more films or sheets disposed on the substrate to impart additional properties such as scratch resistance, ultraviolet light resistance, aesthetic appeal, lubricity, and biocompatibility. Coatings can be applied through standard application techniques such as rolling, spraying, dipping, brushing, or flow coating.

Those skilled in the art will also appreciate that known surface modification processes such as to heat-setting, texturing, embossing, corona treatment, flame treatment, plasma treatment and vacuum deposition can further be applied to the above articles to alter surface appearances and impart additional functionalities to the articles.

In a specific embodiment, a photochromic dye is added to an article by diffusion. For example, after shaping or molding, an article can be exposed to an organic solvent containing a photochromic dye. The solvent and dye diffuse into the article. The solvent is then removed from the article, for example by evaporation, leaving the dye diffused in the article.

The articles are useful in a variety of applications, for example, in consumer goods such as a cell phone cover, a miming shoe component, or a frame or lens for glasses, sunglasses, and goggles. The articles are also useful in window glazing, as an interlayer for laminated glass windshields for safety and security, in decorative applications, in infrared reduction by reducing solar energy directed through glass or plastic by absorption or reflection of infrared light (wavelengths of 700-2500 nm, and 2500 nm and above), in acoustic reduction, in heads up display (HUD), in electrochromic devices, and as a thin film encapsulant of a photovoltaic printed circuit. Other industrial applications include hoses, tubing, inboard and outboard constant velocity joints (CVJ), boots on front wheel drive vehicles, prop shaft boots, rear wheel drive boots, and air ducts. In addition, these articles can be used in wire and cable applications. The compositions can be used as a solvent-cast film for overmolding, as described, for example, in U.S. Pat. No. 6,114,437. The compositions can be useful to impart a soft-to-the-touch feel on handles of tools and appliances. In a specific embodiment, the article is a touch screen panel. When the composition is used as a layer in a multilayer article, the substrate can be a lens.

The compositions are further described in the following illustrative examples in which all parts and percentages are by weight unless otherwise indicated.

EXAMPLES

Table 1 shows the materials that are used in Examples 1-8 and Comparative Examples 1-39.

TABLE 1

| Material | Description | Source |
|---|---|---|
| DMBPC | BPA polycarbonate comprising 50 mole % of units derived from 1,1-bis(4-hydroxy-3-methylphenyl)cyclohexane, Mw = 22,000 to 35,000 | SABIC Innovative Plastics |
| BPA-PC-1 | BPA polycarbonate homopolymer, MFR = 7 at 300° C./1.2 kgf | SABIC Innovative Plastics |
| BPA-PC-2 | BPA polycarbonate homopolymer, MFR = 12 at 250° C./1.2 kgf | SABIC Innovative Plastics |
| PC-Si | Polycarbonate-siloxane copolymer with a siloxane content of 6 wt % | SABIC Innovative Plastics |
| ABS | BLENDEX 415 Acrylonitrile Butadiene Styrene terpolymer | SABIC Innovative Plastics |
| PCCD 2k | Poly(1,4-cyclohexane dimethanol dimethyl 1,4-cyclohexane dicarboxylate), IV = 0.83 | Eastman Chemical |
| PCCD 4k | Poly(1,4-cyclohexane dimethanol dimethyl 1,4-cyclohexane dicarboxylate), IV = 0.96 | Eastman Chemical |
| NEOSTAR FN006 | Poly(ether-ester) copolymer based on poly(1,4-cyclohexane dimethanol dimethyl 1,4-cyclohexane dicarboxylate) | Eastman Chemical |
| HYTREL 4056 | Poly(ether-ether) copolymer with 55 wt % PBT hard block units, 45 wt % PTHF soft block units of a molecular weight of 1000, and with 22 mol % isophthalate in the PBT moieties | DuPont |
| HYTREL 4556 | Poly(ether-ester) copolymer with 50 wt % PTHF having a molecular weight of 1500 | DuPont |
| TPEE, 50% PTHF | Poly(ether-ester) copolymer with 50 wt % PTHF of a molecular weight of 2000 | SABIC Innovative Plastics |
| ARNITEL EL630 | Poly(ether-ester) copolymer with 25 wt % PTHF | DSM |
| HYTREL 6356 | Poly(ether-ester) copolymer with 27 wt % PTHF | DuPont |
| HYTREL 3078 | Poly(ether-ester) copolymer with 64 wt % PTHF | DuPont |
| PEPQ | Tetrakis(2,4-di-tert-butylphenyl) 4,4'-biphenylene diphosphonite (SANDOSTAB ® P-EPQ) | Clariant |
| Phosphite Stab | Bis(2,4-di-tert-butylphenyl)pentaerythritol diphosphite (ULTRANOX 626) | Chemtura |
| ADR 4368 | Styrene-acrylate-epoxy oligomer (JONCRYL) | BASF |
| Phos. Acid | 10% phosphoric acid in water | Fisher Scientific |
| MZP | Monozinc phosphate | Budenheim |
| PC dye grey | Napthopyran photochromic dye (REVERSACOL Midnight Grey) | Keystone Aniline Corporation |
| PC dye purple | Spirooxazine Photochromic dye (REVERSACOL Palatinate Purple) | Keystone Aniline Corporation |

Preparation Procedures

Natural Compositions (Without Pigment or Dye).

The ingredients were tumble-blended and then compounded on a 27 mm Werner-Pfleiderer Twin Screw Extruder with vacuum vented co-rotating mixing screws. The temperature was set at 200 to 250° C. and screw speed between 400 and 450 rpm. The extrudate was cooled through a water bath prior to pelletization. The typical output rate for this extruder was 50 lbs/hr.

Photochromic Compositions.

The ingredients were tumble-blended and then compounded on a 16 mm Thermo Prism TSE16TC Twin Screw Extruder with co-rotating mixing screws and a 400 mm barrel length. The temperature was set at the following for each example: Exs. 7-8 (190 to 216° C.); CEx. 32-39 (190 to 232° C.) and screw speed 500 rpm. The extrudate was cooled through a cold-water bath prior to pelletization. Examples 7-8 were injection molded at 216° C. into 2.54 mm thick color plaques. Comparative examples 32-39 were injection molded at 232° C. into 2.54 mm thick color plaques.

Testing Procedures

The chemical composition of the poly(ether-ester) copolymers was determined with $^1$H NMR Spectroscopy using a Varian Mercury NMR spectrometer (400 MHz). Samples were dissolved in CDCl₃/TFA-D (7:3 v/v) at a concentration between 40 and 50 mg/mL.

Vicat softening temperature (VST) was measured according to the standard ISO 306 test method. The sample is subject to 10N and the heating rate for the test is 50° C./hour.

Shore D hardness was measured according to ASTM D2240 on Izod test bars. The average of at least two measurements was taken.

Melt volume rate (MVR) was determined using pellets dried for 2 hours at 80° C., in accordance with ISO 1133 at 265° C. at a load of 2.16 kg or 295° C. at a load of 2.2 kg, at dwelling time of 240 seconds and 0.0825 inch (2.1 mm) orifice, and is reported in cubic centimeters per 10 minutes ($cm^3$/10 min).

Flexural testing was measured using 5 by ½×⅛ inch (127× 12.7×3 2 mm) bars at a crosshead speed of 0.05 in/min, according to ASTM 790.

Notched Izod impact testing was done on 2.5×½×⅛ inch (62×12.7×3.2 mm) bars according to ASTM D256. For each material/temperature combination 5 bars were tested and the average energy was recorded in J/m. The tests were conducted at 23° C. and at −40° C. The bars were conditioned at the test temperature prior to testing. In agreement with ASTM D256, the type of failure was recorded for each individual bar: complete break (C), hinge break (H), partial break (P), nonbreak (NB). In the test results, the last three failure types are considered "ductile," whereas complete break is considered "brittle." The percentage of the 5 bars tested that failed in a ductile manner is listed in the tables below as "% ductility."

Tensile performance data were measured according to ASTM D638 for Low-Modulus materials. This test method is used to determine the tensile properties of low-modulus plastic, ASTM Type I, dumbbell-shaped bars. The test has an initial speed of one inch per minute and after 50% strain increases to two inches per minute. The test runs until the sample break or until the extensometer reaches its extension limit of 400%. Reported are all or a selected group of properties from this list: Modulus of Elasticity, Stress at 5% Strain, Stress at 10% Strain, Stress at 50% Strain, Maximum Stress, and Elongation at Break.

Light transmission and haze of natural compositions (without pigment or dye) were measured in accordance with ASTM D 1003-00 Procedure A, using an integrating sphere (8°/diffuse) geometry, wherein the spectral sensitivity conforms to the CIE standard spectral value under standard lamp D65. Light transmission and haze was measured on 3.2±0.12 millimeter (mm) thick plaques.

Light transmission data of photochromic compositions was collected on unactivated and activated samples. All samples were measured on a Macbeth 7000A calibrated with a Spectralon reflectance standard. The instrument parameters were set to SCI mode, UV excluded, large lens, large area view, with 2 degree observer.

The effect that photochromic dyes had on the natural composition (residual color) following injection molding was measured on unactivated samples as the difference in luminous light transmission (ΔY) between the natural composition and a dyed composition.

Activation was achieved by irradiating samples with a B100AP UV-A lamp (manufactured by UVP LLC) for 30 seconds and 5 minutes (saturation) at 24° C. and 8 milliwatts per square centimeter. The change in light transmission caused by activation with UV-A was measured at both times as the difference in initial Y of an unactivated dye composition and Y of an activated dye composition. The time required to reach the half point between the colored state and colorless state was measured as the half-life ($t_{1/2}$ fade) in seconds. Photochromic compositions were made in accordance to the preparation process described above. Photochromic articles were made by the procedures described above. The results are summarized in Tables 8 and 9.

Examples 1-2 and Comparative Examples 1-4

The purpose of these examples was to evaluate properties of compositions made in accordance this invention as well as compositions with physically different components.

Compositions were made in accordance to the preparation process for natural compositions described above. The compositions were then tested for the indicated properties shown in Table 2 in accordance to the testing procedures described above.

TABLE 2

|  | Formulation | Ex-1 | Ex-2 | CE-1 | CE-2 | CE-3 | CE-4 |
|---|---|---|---|---|---|---|---|
| DMBPC | wt % | 49.9 | 49.9 | 49.9 | 49.9 | 49.9 | 49.9 |
| HYTREL 4056 | wt % | 50.0 |  |  |  |  |  |
| HYTREL 4556 | wt % |  | 50.0 |  |  |  |  |
| TPEE, 50% PTHF | wt % |  |  | 50.0 |  |  |  |
| ARNITEL EL630 TPEE | wt % |  |  |  | 50.0 |  |  |
| HYTREL 6356 | wt % |  |  |  |  | 50.0 |  |
| HYTREL 3078 | wt % |  |  |  |  |  | 50.0 |
| PEPQ | wt % | 0.10 | 0.10 | 0.10 | 0.10 | 0.10 | 0.10 |
| Phos. Acid | wt % | 0.05 | 0.05 | 0.05 | 0.05 | 0.05 | 0.05 |
|  | Sum (wt %) | 100.00 | 100.00 | 100.00 | 100.00 | 100.00 | 100.00 |
| TPEE Comp. | wt % PTHF | 45 | 50 | 50 | 25 | 27 | 64 |
| TPEE Comp. | wt % Iso-PBT | 22 | 0 | 0 | 0 | 0 | 0 |
| TPEE Comp. | Mw PTHF | 1000 | 1500 | 2000 |  |  |  |
| Appearance | Visual | transparent | transparent | opaque | opaque | opaque | opaque |
| Shore D |  | 66 | 67 |  | 73 | 75 | 49 |
| MVR, 265° C./2.16 kg | $cm^3$/10 min | 24 | 26 | 16 | 24 | 23 | 25 |
| Notched Izod, 23° C. | % ductility | 100 | 100 | 100 | 0 | 0 |  |
|  | J/m | 1210 | 891 | 922 | 86 | 47 |  |

TABLE 2-continued

|  | Formulation | Ex-1 | Ex-2 | CE-1 | CE-2 | CE-3 | CE-4 |
|---|---|---|---|---|---|---|---|
| Notched Izod, −40° C. | % ductility | 0 | 0 |  | 0 | 0 | 100 |
|  | J/m | 26 | 66 |  | 43 | 25 | 563 |
| Vicat, 10N −50° C./h | ° C. | 42 | 76 | 64 | 137 | 96 | 104 |

Examples Ex-1 and Ex-2 in Table 2 show that it is possible to obtain a favorable combination of transparency and room temperature impact ductility by blending a polycarbonate of formula 1, in particular a polycarbonate comprising units derived from DMBPC, with a poly(ether-ester) copolymer. Comparative examples CE-1 to CE-4 in Table 2 demonstrate that the poly(ether-ester) copolymer should have certain compositional features in order to obtain transparency and room temperature impact ductility, the properties being as follows: (1) an amount of the soft block units in the range of 40 wt % to 60 wt %; (2) an amount of isophthalate in the hard block units (the PBT portion of the poly(ether-ester) copolymer) in the range of 0 to 30 mole %, based on the moles of the hard block ester units in the poly(ether-ester) copolymer); and (3) a molecular weight of the poly(oxytetramethylene) glycol groups in the soft block units in the range of 300 to 1800 Daltons.

Comparative Examples 5-11

The purpose of these comparative examples was to evaluate the performance of compositions made without a polycarbonate of formula (1), that is, a polycarbonate made without the bisphenol cyclohexylidene monomers (2) as described above.

Compositions were made in accordance with the preparation process described above. The compositions were then tested for the indicated properties shown in Table 3 in accordance with the testing procedures described above.

Comparative examples CE-5 to CE-11 demonstrate that the favorable combination of properties that was obtained with the compositions of examples of the invention (Ex-1 and Ex-2) is not obtained if a BPA homopolycarbonate is used instead of a DMBPC polycarbonate. As shown in Table 3, in certain cases, notably CE-5, CE-9, and CE-10, transparent blends are obtained, and in other cases, notably CE-6, CE-7, CE-8, and CE-11, good ductility is obtained. However, in none of the comparative examples in Table 3 is the combination of both properties obtained.

Example 3 and Comparative Examples 12-13

The purpose of these examples was to evaluate what amounts of the polycarbonate of formula (1), in particular, a polycarbonate comprising units derived from DMBPC, result in compositions having both transparency and good impact properties.

Compositions were made in accordance with the preparation process for the natural compositions (without pigment or dye) described above. The compositions were then tested for the indicated properties shown in Table 4 in accordance with the testing procedures described above.

TABLE 4

| Formulation |  | Ex-3 | CE-12 | CE-13 |
|---|---|---|---|---|
| DMBPC | wt % | 49.85 | 59.85 | 39.85 |
| HYTREL 4056 | wt % | 49.85 | 39.85 | 59.85 |
| PEPQ | wt % | 0.2 | 0.2 | 0.2 |
| MZP | wt % | 0.1 | 0.1 | 0.1 |
| Sum (wt %) |  | 100 | 100 | 100 |

TABLE 3

| Formulation |  | CE-5 | CE-6 | CE-7 | CE-8 | CE-9 | CE-10 | CE-11 |
|---|---|---|---|---|---|---|---|---|
| BPA-PC-1 | wt % | 74.9 | 49.9 | 24.9 | 49.9 | 49.9 | 49.9 | 49.9 |
| HYTREL 4056 | wt % | 25.0 | 50.0 | 75.0 |  |  |  |  |
| HYTREL 4556 | wt % |  |  |  | 50.0 |  |  |  |
| ARNITEL EL630 | wt % |  |  |  |  | 50.0 |  |  |
| HYTREL 6356 | wt % |  |  |  |  |  | 50.0 |  |
| HYTREL 3078 | wt % |  |  |  |  |  |  | 50.0 |
| PEPQ | wt % | 0.10 | 0.10 | 0.10 | 0.10 | 0.10 | 0.10 | 0.10 |
| Phos. Acid |  | 0.05 | 0.05 | 0.05 | 0.05 | 0.05 | 0.05 | 0.05 |
|  | Sum | 100.00 | 100.00 | 100.00 | 100.00 | 100.00 | 100.00 | 100.00 |
| TPEE Comp. | wt % | 45 | 45 | 45 | 50 | 25 | 27 | 64 |
| TPEE Comp. | wt % Iso-PBT | 22 | 22 | 22 | 0 | 0 | 0 | 0 |
| Appearance | visual | transparent | opaque | opaque | opaque | transparent | transparent | opaque |
| Shore D |  | 75 | 63 | 54 | 64 | 74 | 72 | 51 |
| MVR | cm³/10 | 14 | 27 | 33 | 32 | 26 | 30 | 29 |
| Notched Izod, 23° C. | % | 0 | 100 |  |  | 0 | 0 |  |
|  | J/m | 46 | 1040 |  |  | 42 | 76 |  |
| Notched Izod, - | % | 0 | 0 | 100 | 100 | 0 | 0 | 100 |
|  | J/m | 35 | 137 | 1180 | 908 | 29 | 36 | 545 |
| Vicat, 10N −50° C./h | ° C. | 96 | 71 | 82 | 110 | 60 | 64 | 122 |

TABLE 4-continued

| | Formulation | Ex-3 | CE-12 | CE-13 |
|---|---|---|---|---|
| Appearance | Visual | transparent | transparent | opaque |
| Transmission | % | 82 | 81 | 50 |
| Haze | % | 4 | 6 | 39 |
| MVR, 250° C./1.2 kg | cm³/10 min | 12 | 11 | 14 |
| Notched Izod, 23° C. | % ductility | 100 | 0 | 100 |
| | J/m | 1520 | 35 | 1040 |
| Vicat, 10 N-50° C./h | ° C. | 46 | 59 | 61 |

The compositions shown in Table 4 demonstrate that in addition to the compositional limitations discussed above, a ratio of polycarbonate of formula (1), in particular a polycarbonate comprising units derived from DMBPC, to poly(ether-ester) copolymer within a certain range results in composition having both transparency and ductility after molding. Comparative example CE-12 demonstrates that if the level of poly(ester-ether) copolymer in the composition is too low, transparency is obtained, but not ductility. If, on the other hand, the poly(ether-ester) content in the composition is too high, ductility is obtained, but not transparency. From this it is deduced that the ratio of weight percent of the polycarbonate to weight percent of the poly(ether-ester) copolymer in the composition should be greater than 0.67 and less than 1.5.

Examples 4-5

The purpose of these examples was to determine whether the polycarbonate of formula (1) could be used in conjunction with a polycarbonate homopolymer and still produce ternary blends with both transparency and good impact properties.

Compositions were made in accordance with the preparation process described above. The compositions were then tested for the indicated properties shown in Table 5 in accordance with the testing procedures described above.

TABLE 5

| | Formulation | Ex-4 | Ex-5 |
|---|---|---|---|
| HYTREL 4056 | wt % | 52.0 | |
| HYTREL 4556 | wt % | | 52.0 |
| DMBPC | wt % | 31.7 | 31.7 |
| BPA-PC-2 | wt % | 16.0 | 16.0 |
| PEPQ | wt % | 0.2 | 0.2 |
| MZP | wt % | 0.1 | 0.1 |

TABLE 5-continued

| | Formulation | Ex-4 | Ex-5 |
|---|---|---|---|
| | Sum (wt %) | 100 | 100 |
| Appearance | Visual | transparent | transparent |
| Transmission | % | 83 | 72 |
| Haze | % | 4 | 14 |
| Vicat, 10N-50° C./h | ° C. | 46 | 65 |
| Tensile Modulus | MPa | 1149 | 1376 |
| Tensile Stress at 5% Strain | MPa | 17 | 25 |
| Tensile Stress at 10% Strain | MPa | 17 | 24 |
| Tensile Stress at 50% Strain | MPa | 16 | 20 |
| Tensile Stress at Break | MPa | 39 | 41 |
| Elongation at Break | % | 244 | 254 |
| Nominal Strain at Break | % | 324 | 305 |
| Notched Izod, 23° C. | % ductility | 100 | 80 |
| | J/m | 1530 | 1040 |
| Flexural Modulus | MPa | 366 | 663 |
| Flexural Stress at 5% Strain | MPa | 12 | 22 |
| Flexural Stress at Yield | MPa | 13 | 23 |
| MVR, 250° C./1.2 kg | cm³/10 min | 15 | 14 |

In Examples Ex-4 and Ex-5 the BPA homopolycarbonate is easily processable and has a low molecular weight. Where the ratio of wt % of BPA homopolycarbonate to wt % of polycarbonate of formula (1) is less than 0.5, a combination of transparency and good room temperature impact ductility is obtained.

Examples 6 and Comparative Examples 14-31

The purpose of these examples was to evaluate whether ternary blends containing the polycarbonates of formula (1), the poly(ether-ester) copolymers, and another copolymer would result in compositions with both transparency and impact properties.

Compositions were made in accordance with the preparation process for natural compositions described above. The compositions were then tested for the indicated properties shown in Tables 6 and 7 in accordance with the testing procedures described above. Results are shown in Tables 6 and 7.

Tables 6 and 7 show that polymer compositions containing polycarbonate, poly(ether-ester), and the polyester PCCD, within certain compositional ranges, surprisingly appear to have the favorable combination of transparency and room temperature ductility. Comparing example Ex-6 in Table 6, versus comparative examples CE-14 to CE-31 in Tables 6 and 7, it is found that in addition to the compositional restrictions already described above for the poly(ether-ester), transparency and ductility are obtained when (1) the polyester elastomer content of the blend is more than 5 wt %; (2) the amount of polycarbonate of formula (1) is less than 35 wt %; and (3) the viscosity of the PCCD polyester is higher than that of the PCCD 2k, i.e., higher than IV=0.83.

TABLE 6

| Formulation | | Ex-6 | CE-14 | CE-15 | CE-16 | CE-17 | CE-18 | CE-19 | CE-20 | CE-21 | CE-22 |
|---|---|---|---|---|---|---|---|---|---|---|---|
| DMBPC | wt % | 25.0 | 25.0 | 25.0 | 34.9 | 34.9 | 34.9 | 34.9 | 34.9 | 34.9 | 42.9 |
| PCCD 2k | wt % | | | 49.9 | 59.9 | 59.9 | 59.9 | | | | |
| PCCD 4k | wt % | 49.9 | 49.9 | | | | | 59.9 | 59.9 | 59.9 | 41.9 |
| HYTREL 4056 | wt % | 25.0 | | | | | 5.0 | 5.0 | | 5.0 | |
| ARNITEL EL630 | wt % | | 25.0 | 25.0 | 5.0 | 5.0 | | | 5.0 | | 15.0 |
| PEPQ | wt % | 0.10 | 0.10 | 0.10 | 0.10 | 0.10 | 0.10 | 0.10 | 0.10 | 0.10 | 0.10 |
| Phos. Acid | wt % | 0.05 | 0.05 | 0.05 | 0.05 | 0.05 | 0.05 | 0.05 | 0.05 | 0.05 | 0.05 |
| | Sum (wt %) | 100 | 100 | 100 | 100 | 100 | 100 | 100 | 100 | 100 | 100 |
| Appearance | visual | transparent | transparent | opaque | opaque | transparent | transparent | transparent | transparent | transparent | transparent | transparent |
| Transmission | % | 75 | 33 | 31 | 89 | 89 | 87 | 83 | 88 | 87 | 56 |
| Haze | % | 7.8 | 95 | 97 | 1.2 | 1.1 | 1.9 | 2.3 | 2.4 | 2.0 | 37 |
| MVR, 265° C., 2.16 kg | cm³/10 min | 26 | 25 | 39 | 27 | 26 | 29 | 19 | 17 | 18 | 19 |
| Notched Izod, 23° C. | % ductility | 60 | 60 | 0 | 0 | 0 | 0 | 0 | 0 | 0 | 0 |
| | J/m | 803 | 708 | 81 | 52 | 52 | 49 | 56 | 61 | 46 | 51 |

TABLE 6-continued

| Formulation | | Ex-6 | CE-14 | CE-15 | CE-16 | CE-17 | CE-18 | CE-19 | CE-20 | CE-21 | CE-22 |
|---|---|---|---|---|---|---|---|---|---|---|---|
| Multi-axial Impact - Total Energy | J | 56 | 57 | 55 | 63 | 65 | 64 | 66 | 62 | 65 | 71 |
| Tensile Modulus of Elasticity | MPa | 886 | 1350 | 1390 | 1580 | 1640 | 1590 | 1620 | 1550 | 1610 | 1560 |
| Tensile Stress at Yield | MPa | 29 | 42 | 44 | 50 | 50 | 50 | 50 | 48 | 48 | 45 |
| Tensile Stress at Break | MPa | 41 | 47 | 54 | 51 | 53 | 50 | 46 | 48 | 51 | 51 |
| Tensile Elongation at Yield | MPa | 6 | 5 | 5 | 5 | 5 | 5 | 5 | 5 | 5 | 5 |
| Tensile Elongation at Break | % | 268 | 227 | 238 | 202 | 210 | 206 | 174 | 175 | 201 | 160 |
| HDT | °C. | 38 | 57 | 55 | 74 | 74 | 68 | 71 | 71 | 69 | 75 |
| Vicat, 10N, 50° C./h | °C. | 56 | 87 | 74 | 86 | 89 | 83 | 86 | | 85 | 93 |

TABLE 7

| | Formulation | CE-23 | CE-24 | CE-25 | CE-26 | CE-27 | CE-28 | CE-29 | CE-30 | CE-31 |
|---|---|---|---|---|---|---|---|---|---|---|
| DMBPC | wt % | 48.9 | 54.9 | 54.9 | 54.9 | 74.9 | 74.9 | 74.9 | 74.9 | 74.9 |
| PCCD 2k | wt % | 31.0 | 20.0 | | | 20.0 | 20.0 | 20.0 | | |
| PCCD 4k | wt % | | | 20.0 | 20.0 | | | | 20.0 | 20.0 |
| HYTREL 4056 | wt % | | 25.0 | 25.0 | | | 5.0 | | 5.0 | |
| ARNITEL EL630 | wt % | 20.0 | | | 25.0 | 5.0 | | 5.0 | | 5.0 |
| PEPQ | wt % | 0.10 | 0.10 | 0.10 | 0.10 | 0.10 | 0.10 | 0.10 | 0.10 | 0.10 |
| Phos. Acid | wt % | 0.05 | 0.05 | 0.05 | 0.05 | 0.05 | 0.05 | 0.05 | 0.05 | 0.05 |
| | Sum (wt %) | 100 | 100 | 100 | 100 | 100 | 100 | 100 | 100 | 100 |
| Appearance | visual | opaque | transparent | transparent | opaque | transparent | transparent | transparent | transparent | transparent |
| Transmission at 3.2 mm thickness | % | 47 | 80 | 80 | 48 | 88 | 86 | 88 | 85 | 84 |
| Haze at 3.2 mm thickness | % | 66 | 3.5 | 3.4 | 67 | 0.9 | 1.4 | 0.8 | 1.7 | 5.9 |
| MVR at 265° C., 2.16 kg | cm³/10 min | 27 | 30 | 25 | 21 | 13 | 14 | 13 | 12 | 11 |
| Notched Izod, 23° C. | % ductility | 0 | 0 | 0 | 0 | 0 | 0 | 0 | 0 | 0 |
| | J/m | 46 | 27 | 28 | 42 | 25 | 25 | 25 | 30 | 26 |
| Multi-axial Impact - Total Energy | J | 62 | 66 | 66 | 63 | 81 | 57 | 73 | 71 | 49 |
| Tensile Modulus of Elasticity | MPa | 1950 | 2150 | 2200 | 2070 | 2410 | 2440 | 2510 | 2450 | 2430 |
| Tensile Stress at Yield | MPa | 56 | 55 | 56 | 57 | 68 | 68 | 67 | 69 | 69 |
| Tensile Stress at Break | MPa | 53 | 36 | 38 | 52 | 54 | 53 | 56 | 52 | 55 |
| Tensile Elongation at Yield | MPa | 5 | 4 | 4 | 5 | 6 | 6 | 7 | 6 | 7 |
| Tensile Elongation at Break | % | 157 | 120 | 164 | 147 | 94 | 88 | 84 | 65 | 110 |
| HDT | °C. | 77 | 54 | 54 | 80 | 104 | 102 | 105 | 102 | 106 |
| Vicat - ASTM D 1525, 10N, 50° C./h | °C. | 103 | 75 | 74 | | 119 | 119 | 121 | 119 | 122 |

Example 7 and Comparative Examples 32-35

The purpose of these examples was to evaluate whether compositions containing photochromic dyes could be used to make transparent articles having photochromic properties.

Four key measurements were used to define performance of the articles: (1) residual color; (2) strength of activated color after 30 seconds of UV exposure; (3) strength of activated color at saturation (after 5 minutes of UV exposure); and (4) half-life ($t_{1/2}$).

Compositions were made in accordance with the preparation process described above for photochromic compositions. The compositions were then tested for the four optical properties described above and the results are shown in Table 8.

TABLE 8

| Component, wt % | Ex-7 | CE-32 | CE-33 | CE-34 | CE-35 |
|---|---|---|---|---|---|
| HYTREL 4056 | 52 | | | | |
| TPEE | | | | | |
| DMBPC | 47.7 | | | | |
| BPA-PC-2 | | 99.94 | 43.9 | 59.85 | 43.1 |
| PCCD 2k | | | 49.65 | | 46.7 |
| PC-Si | | | 6.0 | | |
| NEOSTAR FN006 | | | | 40 | |
| ABS | | | | | 10 |
| ADR 4368 | | | 0.25 | | |
| PEPQ | 0.2 | | 0.15 | 0.1 | 0.15 |
| Phosphite Stab | | 0.06 | | | |
| Phos. Acid | | | 0.05 | 0.05 | 0.05 |
| MZP | 0.1 | | | | |
| PC dye grey Residual Color (unexposed) | 0.035 | 0.035 | 0.035 | 0.035 | 0.035 |
| ΔY (natural-sample) | 3.8 | 17.7 | 9.6 | 3.7 | 2.2 |
| Photochromic Properties | | | | | |
| ΔY (30 sec.) | 19.9 | 6.8 | 7.6 | 9.3 | 6.8 |
| ΔY (saturation) | 31.8 | 14.2 | 16.1 | 19.1 | 13.6 |
| $t_{1/2}$ fade (seconds) | 81 | >600 | >600 | 233 | 465 |

As shown in Table 8, the performance of example Ex-7, which contained the polycarbonate of formula (1), in particular a polycarbonate comprising units derived from DMBPC, was superior in all four measurement categories, as compared to polycarbonate (CE-32) and other polycarbonate blends (CE-33, CE-34, and CE-35). These comparative examples were also processed at low temperatures.

Example Ex-7 in Table 8 shows that blends of the polycarbonates of formula (1) with poly(ether-ester) copolymers as described herein provide a favorable environment for photochromic dyes to efficiently operate in the four key areas. The residual color contribution from the dye is minor. Unexposed plaques had a slight green color. Residual color was measured by a decrease in light transmission ($\Delta Y=3.8$) of dyed samples compared to a natural control that does not contain dyes. The natural composition (having no pigment or dye) has slightly greater light transmission than do the unexposed samples containing photochromic dye. Light transmission appreciably decreases following 30 seconds of excitation with ultraviolet light. The midnight grey sample appears neutral grey when activated. Transmission continues to decrease with additional UV exposure up to saturation with total $\Delta Y=32$. Finally, once the UV light source is removed, the sample immediately returns to a lighter appearance. Color strength fades to half the initial light transmittance after 81 seconds.

Comparative examples CE-32 to CE-35 demonstrate that other polymers that can be processed at lower temperatures do not yield favorable optical changes in all four combined measurements. Comparative examples CE-32 and CE-33 contain midnight grey photochromic dye and were strongly discolored as measured by residual color. These samples showed only minor reduction in transmission following UV exposure and had very long fade times. Comparative examples CE-34 and CE-35 had low residual color, however, these samples failed to darken and fade rapidly.

Example 8 and Comparative Examples 36-39

The purpose of these examples was to evaluate whether compositions containing a photochromic dye different from the photochromic dye used in example Ex-7 and comparative examples CE-32 to CE-35 could be used to make transparent articles having desirable photochromic properties.

Compositions were made in accordance to the preparation process described above for photochromic compositions. Articles were made and tested in accordance with the procedures used in example Ex-7 and comparative examples CE-32 to CE-35. Results are shown in Table 9.

TABLE 9

| Formulation, wt. | Ex-8 | CE-36 | CE-37 | CE-38 | CE-39 |
| --- | --- | --- | --- | --- | --- |
| HYTREL 4056 | 52 | | | | |
| DMBPC | 47.7 | | | | |
| BPA-PC-2 | | 99.94 | 43.9 | 59.85 | 43.1 |
| PCCD 2k | | | 49.65 | | 46.7 |
| PC-Si | | | 6.0 | | |
| NEOSTAR FN006 | | | | 40 | |
| ABS | | | | | 10 |
| ADR 4368 | | | 0.25 | | |
| PEPQ | 0.2 | | 0.15 | 0.1 | 0.15 |
| Phosphite Stab | | 0.06 | | | |
| Phos. Acid | | | 0.05 | 0.05 | 0.05 |
| MZP | 0.1 | | | | |
| PC dye Purple | 0.035 | 0.035 | 0.035 | 0.035 | 0.035 |
| Residual Color (unexposed) | | | | | |
| $\Delta Y$ (natural - sample) | 5.9 | 16.7 | 15.1 | 9.3 | 4.5 |

TABLE 9-continued

| Formulation, wt. | Ex-8 | CE-36 | CE-37 | CE-38 | CE-39 |
| --- | --- | --- | --- | --- | --- |
| Photochromic Properties | | | | | |
| $\Delta Y$ (30 sec.) | 33.0 | 10.3 | 16.7 | 16.6 | 2.75 |
| $\Delta Y$ (Saturation) | 42.2 | 18.4 | 29.5 | 27.6 | 4.8 |
| $t_{1/2}$ fade (seconds) | 53 | 236 | 238 | 100 | 164 |

Example Ex-8 in Table 9 shows that blends of the polycarbonates of formula (1) with poly(ether-ester) copolymers as described herein provide a favorable environment for other types of photochromic dyes. Palatinate Purple also efficiently operates in the four key areas. The residual color contribution from the dye is minor. Unexposed plaques had a slight green-brown color. Residual color was measured by a decrease in light transmittance ($\Delta Y=5.9$) of dyed samples compared to a natural control that does not contain dyes. The natural composition (without dye) has slightly greater light transmission than do unexposed samples containing photochromic dye. Light transmission appreciably decreases following 30 seconds of excitation with ultraviolet light. The Palatinate Purple sample appears blue. Transmission continues to decrease with additional UV exposure up to saturation with total $\Delta Y=33$. Finally, once the UV light source is removed, the sample immediately returns to a lighter appearance. Color strength fades to half the light transmission after 53 seconds.

Comparative examples CE-36 to CE-39 in Table 9 demonstrate that other resins that can be processed at lower temperatures do not yield favorable optical changes in all four combined measurements. Comparative examples CE-36 and CE-37 contain Palatinate Purple photochromic dye and were strongly discolored as measured by residual color. These samples showed only minor reduction in transmission following UV exposure and had very long fade times. Comparative examples CE-38 and CE-39 had low residual color, however, these samples also failed to darken and fade rapidly.

Examples 9 and 10

The purpose of this example was to show that the compositions could be made into film and multilayer articles containing the film.

Multi-layer films were produced with good optical properties, adhesion, and warp resistance. These articles included an A-B-A or A-B assembly, where A is a polymer layer such as a polycarbonate layer, and B is a layer comprising the blends of the polycarbonates of formula (1) with poly(ether-ester) copolymers as described herein. The typical properties of a commercial film layer came from the A layer while the functional aspects of the article were derived from the B layer. The B layer contained photochromic dyes. The B layer need not contain functional additives.

Monolayer, two-layer, and three-layer film constructions were produced with high transmission on a Randcastle film extrusion system. When heated and a tensile stress was applied, both two-layer and three-layer constructions exhibited lower plastic deformation compared to a monolayer containing a blend of the polycarbonates of formula (1) with poly(ether-ester) copolymers as described herein. Multi-layer films were found to have good adhesion and light transmission after approximately 8 months. Multi-layer films had good adhesion and light transmission and dimensional retention (less warp) following exposure to abusive conditions, such as oven aging and dishwasher exposure.

Results for a monolayer film (Ex-9) and a three-layer film (Ex-10) are shown in Table 10. The monolayer film of example Ex-9 is 0.035 inches (0.889 mm) thick. The three-layer film of example Ex-10 comprised a top and bottom layer of optical quality polycarbonate having a thickness of 6 to 10 mils, and a middle layer comprising a blend of the polycarbonates of formula (1) and poly(ether-ester) copolymers as described herein and having a thickness of 14 to 23 mils.

TABLE 10

|  | Ex-9 Monolayer | Ex-10 Three-layer |
|---|---|---|
| Aging in Dishwasher (One cycle) | | |
| % Transmission | 72.7 | 78.0 |
| Haze | 12.5 | 10.5 |
| Aging at 70° C., three days | | |
| % Transmission | 69.8 | 75.9 |
| Haze | 18.1 | 11.0 |

When the films were exposed to one dishwasher cycle, the monolayer of Ex-9 was found to severely warp while the three-layer film of Ex-10 retained most of its initial shape. Moreover, the three-layer film survived abusive conditions with better optical properties (higher percent transmission and lower haze) than the monolayer as shown.

The above results show that regardless of the aging conditions, the optical properties (light transmission and haze) of the three-layer film are improved relative to the optical properties of the monolayer film.

Although the present invention has been described in detail with reference to certain preferred versions thereof, other variations are possible. Therefore, the spirit and scope of the appended claims should not be limited to the description of the versions contained therein.

What is claimed is:

1. A composition comprising:
a polycarbonate comprising units derived from a bisphenol cyclohexylidene of the formula:

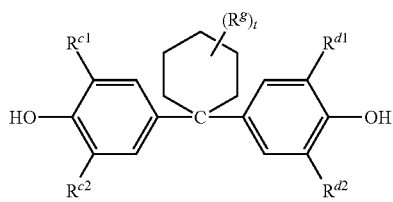

wherein $R^{c1}$ and $R^{d1}$ are each independently $C_{1-12}$ alkyl, $R^{c2}$ and $R^{d2}$ are each independently hydrogen or $C_{1-12}$ alkyl, $R^g$ is $C_{1-12}$ alkyl or halogen, and t is 0 to 10;

a poly(ether-ester) copolymer comprising
40 to 60 wt % of polyester hard block units derived from a $C_6$-$C_{24}$ aromatic dicarboxylic acid or a $C_6$-$C_{24}$ alicyclic dicarboxylic acid and at least one glycol component, wherein when the $C_6$-$C_{24}$ aromatic dicarboxylic acid comprises terephthalic acid, isophthalic acid groups are present in an amount from 0 to 30 mole %, based on the total moles of isophthalic acid groups and terephthalic acid groups in the hard block units, and 40 to 60 wt % of polyether soft block units derived from poly(oxytetramethylene) glycol, wherein the molecular weight of the poly(oxytetramethylene) glycol groups is from 300 to 1800 Daltons; and a photochromic dye;

wherein
the composition has at least 20% ductility as determined using molded 3.2 mm thick bars according to ASTM D256-02 and measured at 23° C.; and
the composition has less than or equal to 20% haze as determined using a molded sample having a thickness of 3.18±0.12 mm according to ASTM D1003-00.

2. The composition of claim 1, wherein the polycarbonate comprises from 45 to 55 mole % of units derived from 1,1-bis(4-hydroxy-3-methylphenyl)cyclohexane.

3. The composition of claim 1, comprising from more than 0 to 50 wt % of the polycarbonate of formula (1).

4. The composition of claim 1, wherein the ratio of the weight percent of the polycarbonate in the composition to the weight percent of the poly(ether-ester) copolymer in the composition is greater than 0.67 and less than 1.5.

5. The composition of claim 1, wherein the poly(ether-ester) copolymer comprises 40 to 50 wt %, based on the weight of the poly(ether-ester), of units derived from poly(oxytetramethylene)glycol.

6. The composition of claim 1, wherein the composition further comprises an aliphatic polyester having a intrinsic viscosity of more than 0.85 dL/g.

7. The composition of claim 1, wherein the composition further comprises a polycarbonate that is different from the polycarbonate copolymer comprising the units derived from the bisphenol cyclohexylidene.

8. The composition of claim 7, wherein the polycarbonate that is different from the polycarbonate copolymer comprising the units derived from the bisphenol cyclohexylidene is a homopolymer comprising units derived from bisphenol A.

9. The composition of claim 1, further comprising an impact modifier present in an amount of 2 to 30 wt % of the total weight of the composition.

10. The composition of claim 9, wherein the impact modifier is an ethylene-glycidyl methacrylate-methacrylate copolymer.

11. The composition of claim 1, wherein the photochromic dye is present in an amount of 1 to 1000 ppm, based on the total parts of the composition by weight.

12. The composition of claim 1, comprising:
50 to 90 wt % of the polycarbonate copolymer of formula (1), wherein the copolymer comprises 45 to 55 mole % of units derived from 1,1-bis(4-hydroxy-3-methylphenyl) cyclohexane and 45 to 55 mol % of units derived from bisphenol A; and
10 to 40 wt % of the poly(ether-ester) copolymer comprising
40 to 60 wt % of polyester hard block units derived from butane diol and, based on the moles of hard block units, 70 to 100 mole % of terephthalic acid and 0 to 30 mole % of isophthalic acid, and
40 to 60 wt % of polyether soft block units derived from poly(oxytetramethylene)glycol, wherein the molecular weight of the poly(oxytetramethylene)glycol-derived units is in the range of 900 to 1600 Daltons;
wherein
the composition has at least 20% ductility as determined on molded 3.2 mm thick bars according to ASTM D256-02 measured at 23° C.; and the composition has less than or equal to 20% haze as determined using a molded sample having a thickness of 3.18±0.12 mm according to ASTM D1003-00.

13. The composition of claim 1, comprising:
10 to 35 wt % of the polycarbonate copolymer of formula (1), wherein the polycarbonate copolymer comprises 45 to 55 mole % of units derived from 1,1-bis(4-hydroxy-3-methylphenyl) cyclohexane and 45 to 55 mole % of units derived from bisphenol A; and
15 to 25 wt % of the poly(ether-ester) copolymer comprising
40 to 60 wt % of polyester hard block units derived from butane diol and, based on the moles of hard block units, 70 to 100 mole % of terephthalic acid and 0 to 30 mole % of isophthalic acid, and
40 to 60 wt % of polyether soft block units derived from poly(oxytetramethylene)glycol, wherein the molecular weight of the poly(oxytetramethylene)glycol-derived units is in the range of 900 to 1600 Daltons; and
45 to 65 wt % of an aliphatic polyester having an intrinsic viscosity of greater than 0.85 dL/g;
wherein
the composition has at least 20% ductility as determined on 3.2 mm thick bars according to ASTM D256-02 measured at 23° C.; and
the composition has less than or equal to 20% haze as determined using a molded sample having a thickness of 3.18±0.12 mm according to ASTM D1003-00.

14. The composition of claim 1 comprising, based on the total weight of the composition:
20 to 40 wt % of the polycarbonate copolymer of formula (1), wherein the polycarbonate copolymer comprises comprising 45 to 55 mole % of units derived from 1,1-bis(4-hydroxy-3-methylphenyl) cyclohexane and 45 to 55 mol % of units derived from bisphenol A; and
10 to 40 wt % of the poly(ether-ester) copolymer comprising
40 to 60 wt % of polyester hard block units derived from butane diol and, based on the moles of hard block units, 70 to 100 mole % of terephthalic acid and 0 to 30 mole % of isophthalic acid, and
40 to 60 wt % of polyether soft block units derived from poly(oxytetramethylene)glycol, wherein the molecular weight of the poly(oxytetramethylene)glycol-derived units is in the range of 900 to 1600 Daltons; and
10 to 30 wt % of a polycarbonate that is not the same as the polycarbonate copolymer,
wherein
the composition has at least 20% ductility as determined on 3.2 mm thick bars according to ASTM D256-02, measured at 23° C.; and
the composition has less than or equal to 20% haze as determined using a molded sample having a thickness of 3.18±0.12 mm according to ASTM D1003-00.

15. An article comprising the composition of claim 1.

16. The article of claim 15, wherein article is in the form of a film, sheet, molded object, or fiber.

17. The article of claim 16, wherein the article is in the form of a film or sheet.

18. The article of claim 17, wherein the film or sheet is window glazing.

19. The article of claim 18, wherein the article is a solvent cast film for an overmolded article.

20. The article of claim 15, wherein the composition of claim 1 comprises 1 to 1000 ppm of the photochromic dye, based on the total parts of the composition by weight.

21. The article of claim 15, wherein when the article is exposed to ultraviolet light for 30 seconds, the article exhibits a reversible decrease in visible light transmission of more than ΔY=17.

22. The article of claim 15, wherein when the article is exposed to ultraviolet light for 5 minutes, the article exhibits a reversible decrease in visible light transmission of more than ΔY=25.

23. A method of forming an article, comprising injection molding the composition of claim 1 at a temperature that is more than 0° C. and less than 300° C.

* * * * *